United States Patent [19]

Groskopfs et al.

[11] 4,079,904
[45] Mar. 21, 1978

[54] MODULE EXCHANGER SYSTEMS

[75] Inventors: Ernest Groskopfs, Caledon East; Douglas W. Knowles, Mississauga; James H. White, Mississauga; Ronald G. Dennys, Mississauga, all of Canada

[73] Assignee: Spar Aerospace Products Ltd., Toronto, Canada

[21] Appl. No.: 654,065

[22] Filed: Feb. 2, 1976

[30] Foreign Application Priority Data

Jan. 30, 1976 Canada .................................... 244842

[51] Int. Cl.² ............................................. B64G 1/00
[52] U.S. Cl. .............................. 244/158; 214/16.4 A; 244/161; 244/162
[58] Field of Search ........................ 244/158, 160–162; 214/16.4 A

[56] References Cited

PUBLICATIONS

*Space Shuttle*, National Aeronautics and Space Administration, Lyndon B. Johnson Space Center, Houston, Texas, Feb. 1975, pp. 12–13, 41.

Cepollina, et al., "In Orbit Servicing", *Astronautics and Aeronautics*, vol. 13, No. 2, 2/3/1975, pp. 48–56 & Magazine Cover.

*Primary Examiner*—Barry L. Kelmachter
*Attorney, Agent, or Firm*—Fetherstonhaugh & Co.

[57] ABSTRACT

A module exchange system including a module manipulator mechanism for use in manipulating modules between a module storage magazine and a satellite. The manipulator includes an adjustable terminal device which is capable of accommodating satellite modules of different geometrical proportions and a latching probe mechanism for releasably latching the modules with respect to the satellite and the module manipulator. The module manipulator is designed for movement along three mutually normal axes and is rotatable about one axis. The adjustable terminal device comprises two pairs of mutually crossed angularly adjustable arms having fingers at their outer ends for securing the modules, the arms being mutually angularly adjustable with respect to one another and telescopic so that the positions of the fingers may be adjusted to be received by modules of different proportions. The satellite is provided with passive latching probes having heads and each module has active latching members which have one end movable into and out of latching engagement with a head of a latching probe to engage the probe to releasably secure the module with respect to the satellite, the active latching members return to earth with the module for servicing. Active latch operators are mounted in the module manipulator to secure and release the module with respect to the satellite, the latch operators remaining with the manipulator to be returned to earth with the shuttle for servicing.

6 Claims, 56 Drawing Figures

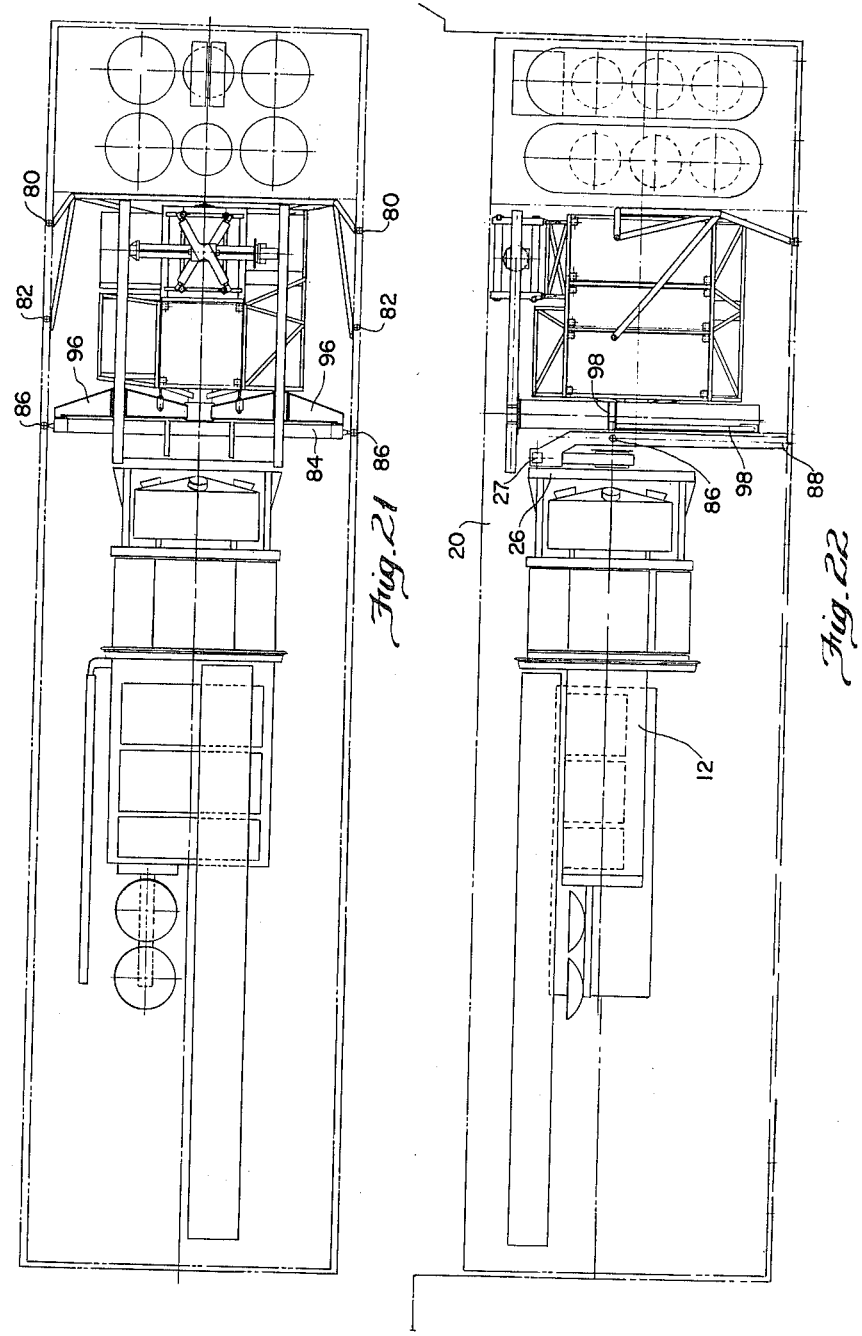

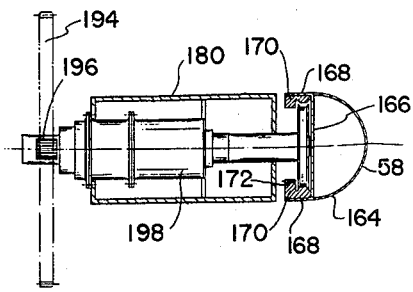
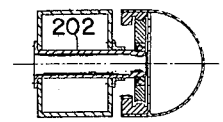
Fig. 37     Fig. 38
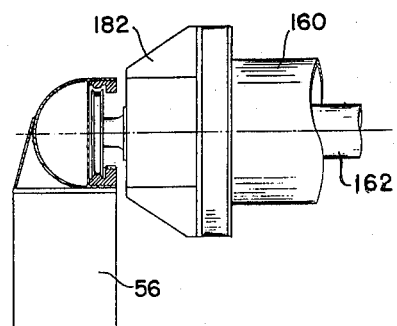
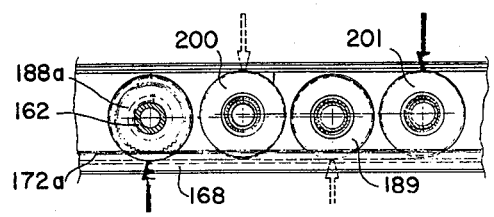
Fig. 39     Fig. 40

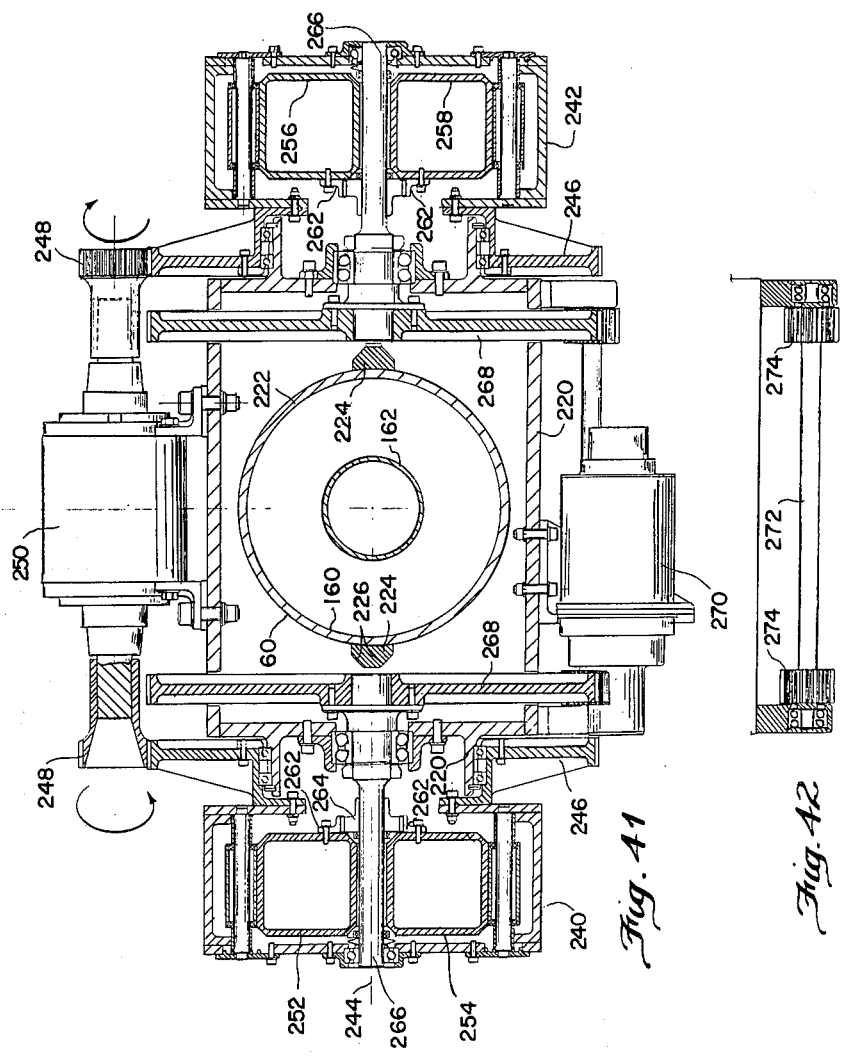

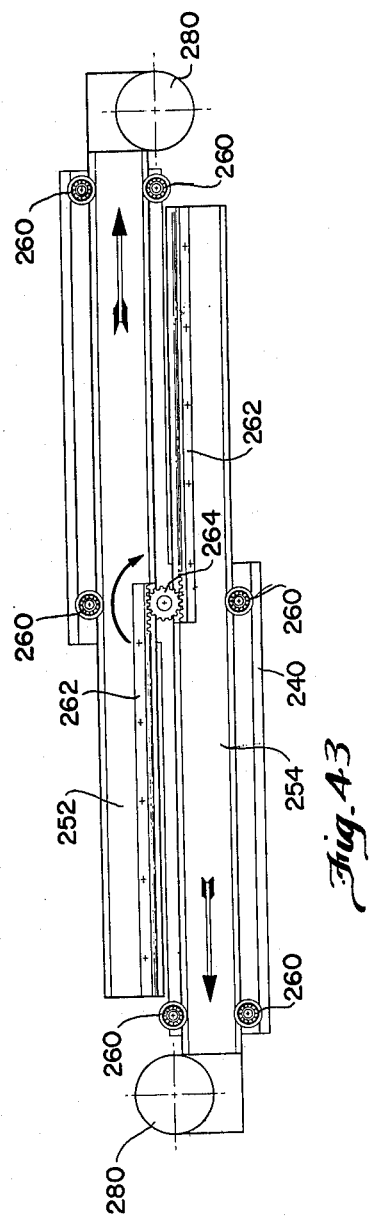
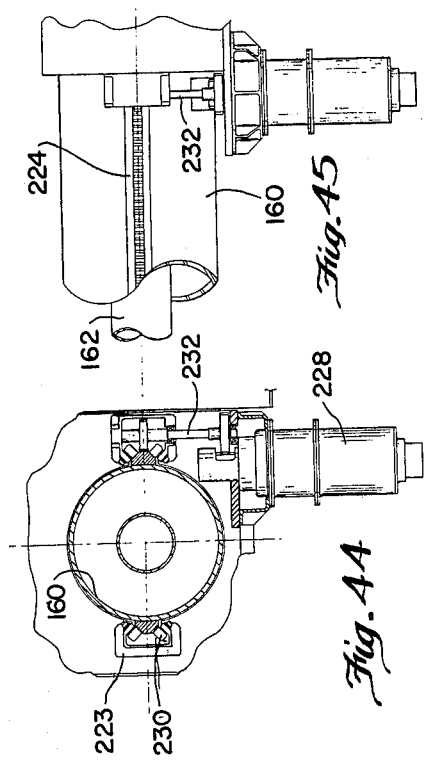

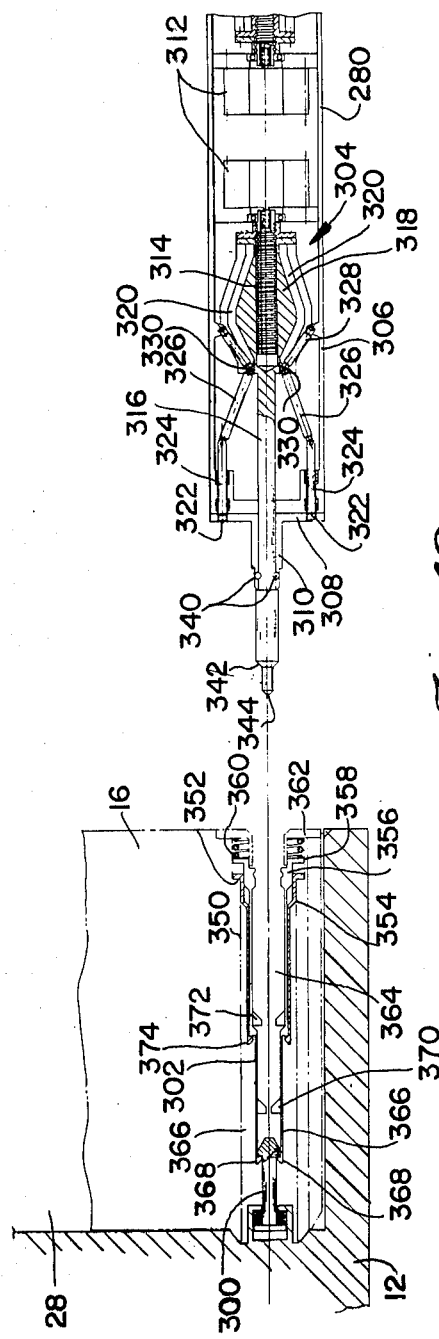
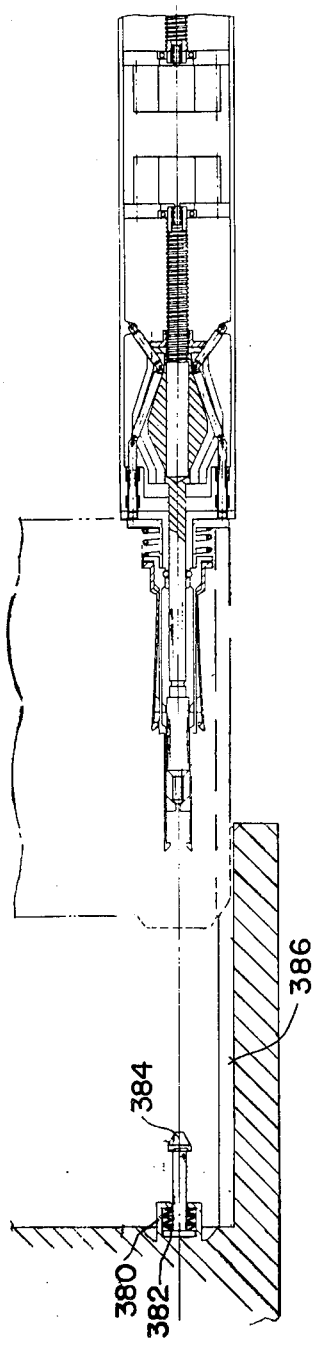
Fig. 49
Fig. 50

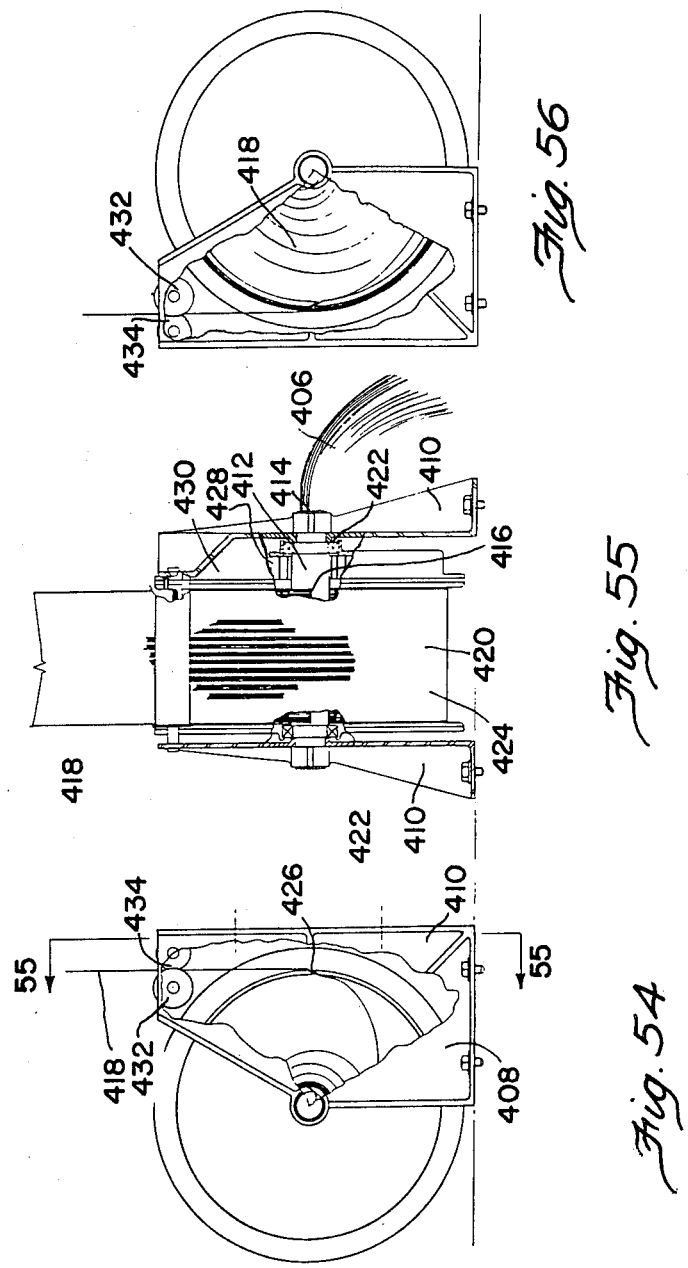

MODULE EXCHANGER SYSTEMS

This invention relates to a module exchange system for use in exchanging modules of any space serviceable satellite in orbit.

The working life of space serviceable satellites presently in orbit is limited by the working life of the satellite sub-systems and experimental or scientific modules. To overcome this difficulty, it has been proposed to employ a space transportation system comprised of a shuttle orbitor and/or space tug system which will be launched into the orbit of the space serviceable satellite and will service the satellite and return to earth. This same task could also be achieved with conventional booster vehicles. The servicing of the satellite will include the removal of spent modules and the replacement of the spent modules with new modules so that the useful life of the orbiting satellite may be extended without requiring the satellite to be returned to earth. To effect this servicing task, the parent vehicle must be equipped with a module manipulator mechanism which is capable of carefully directing and placing the spacecraft equipment with considerable precision. The mechanism must also be capable of generating loads that are adequate to secure the modules in place, either to the spacecraft or to the module storage magazine carried by the parent vehicle.

In order to obtain the required transfer of a module from a storage magazine carried by the shuttle orbitor, tug or conventional vehicle to a module compartment of the satellite, the manipulator mechanism must have the ability to move in a plurality of different planes so as to effect the precise location of the modules with respect to the storage magazine and the satellite.

In view of the fact that the modules of many satellites will vary in their dimensions, it is important to provide a module manipulator having a variable geometry to accommodate the different proportions of different modules. Certain satellite servicing missions will have replaceable modules of like dimensions, in which case a terminal device with fixed geometry would be required.

In order to ensure that the modules are effectively transferred between the satellite and the storage magazine, it is important to provide a latching mechanism for connecting the module to the satellite and for connecting the module to the module manipulator and storage magazine, which latching mechanism is simple to operate and in which the major active components are carried by the module and the manipulator so as to be serviceable upon return of the module with the shuttle orbitor to earth.

SUMMARY OF INVENTION

The difficulties described above with respect to the provision of a module manipulator mechanism for effectively servicing any space serviceable satellites which are entrapped by the shuttle orbitor, tug or conventional vehicles and secured on a servicing platform in a position with at least one module thereof located in an exchange position are overcome by the module manipulator mechanism which comprises a replacement module storage magazine having at least one replacement module located therein, longitudinally extensible column means having an inner end and an outer end, the column means being mounted at its inner end adjacent the storage magazine, the extensible column means being extensible along a first axis or in Z-axis direction from a first position closely adjacent the magazine to a second position in which the outer end thereof is located adjacent the module of the entrapped satellite, the modules of which are to be replaced, guide rail means mounted at the outer end of the extensible column means and extending normal thereto, said guide rail means extending above the module storage means along a second axis, or X-axis direction, transverse support means mounted on the guide rail means and extending along a third axis, or Y-axis direction normal to the axis of the Z-axis direction, said transverse support means being mounted for movement along the guide rail means from a position overlying the storage magazine to a position closely adjacent the satellite, a terminal device mounted on the transverse support means for rotation in an angular direction $\theta$ about the Y-axis of the transverse support means, module engaging means mounted on the terminal device for releasing a module from a satellite and magazine and securing it with respect to the terminal device for transfer therebetween, said terminal device being movable along the transverse support means in the direction of the Y-axis, Z-drive means communicating with the extensible column means for moving the extensible column means to move the terminal device into engagement with a module in a storage magazine to elevate the guide rail means to align the terminal device with respect to the replacement module of the satellite, X-drive means communicating with the transverse support means for driving the transverse support means along the guide rail means to align the terminal device with a module in the magazine and to move the terminal device into and out of engagement with a module of the satellite, $\theta$-drive means communicating with the terminal device for rotatably driving the terminal device about the $\theta$-axis of the transverse support means to orient the terminal device in alignment with the magazine or satellite module as required, Y-drive means communicating with the terminal device for driving the terminal device along the transverse support means in a direction of the Y-axis to transversely align the terminal device with respect to the modules of the magazine and satellite as required.

The variable geometry of the modules of the satellite is accommodated by providing an adjustable terminal device for use in the module manipulator. The adjustable terminal device comprises two sets of arms each consisting of a pair of substantially longitudinally aligned arms and telescopic drive means connecting the arms of each pair centrally of their combined length for longitudinally extending and contracting each pair of arms, means connecting one set of arms with respect to the other set of arms in an X-shaped configuration for angular movement of one set of arms with respect to the other set of arms about an axis extending normal to the point of intersection of the X-shaped configuration, finger means at the outer end of each arm extending normal to the arms and outwardly from opposite sides thereof, the finger means being arranged in a spaced parallel configuration with respect to one another to provide four fingers on each of two sides of said arms for engaging and securing a module of like size on each side of said arms, scissors drive means communicating with each set of arms for operably and synchronously driving the arms about said axis to adjust the spacing between adjacent fingers.

In the module exchange system of the present invention, a latching probe means is in the module compartment of a satellite and is provided with a passive latching head at the outer end thereof, active latching means is mounted in each module. The active latching means has one end movable into and out of latching engagement with a passive latching head of the latching probe to releasably engage the probe to releasably secure the module with respect to the satellite. The active latching means is retained by the module so as to be removed with the module for return to earth with the module for servicing. Active latch operating means is mounted in the module manipulator means for engaging and activating the latching means to engage and release the passive latching head to secure and release the module with respect to the satellite, the latch operating means being retained by the manipulator to be returned to earth with the satellite for servicing.

PREFERRED EMBODIMENT

The invention will be more clearly understood after reference to the following detailed specification read in conjunction with the drawings wherein FIG. 1 is a pictorial view illustrating the manner in which the satellite is serviced by means of a module manipulator mounted in the cargo bay of a shuttle orbitor;

FIGS. 2 to 10 inclusive are diagrammatic side view of the various positions of the module manipulator in effecting transfer of the module;

FIGS. 11 to 15 inclusive are diagrammatic pictorial illustrations of the manner in which the geometry of the terminal device is adjusted to accommodate modules of different proportions;

FIG. 21 is a plan view of a satellite and the module manipulator stored within the cargo bay of the orbitor;

FIG. 22 is a side view of the satellite and module manipulator stored within the cargo bay of the shuttle orbitor;

FIG. 37 is a sectional view taken along the line 37—37 of FIG. 32;

FIG. 38 is a sectional view taken along the line 38—38 of FIG. 32;

FIG. 39 is a sectional view taken along the line 39—39 of FIG. 32;

FIG. 40 is a sectional view taken along the line 40—40 of FIG. 32;

FIG. 41 is a sectional view of the terminal device;

FIG. 42 is a side view of the synchronizing driving shaft of FIG. 41;

FIG. 43 is a side view of the telescopic drive means taken along the line 43—43 of FIG. 42;

FIG. 44 is a sectioned end view of the Y-drive means;

FIG. 45 is a side view of the Y-drive means;

FIG. 49 is a sectioned side view of a latching mechanism including the latch operator;

FIG. 50 is a sectional view similar to FIG. 49 showing the module mounted on the latch operator;

FIG. 54 is an enlarged side view of a flat conductor cable retractor;

FIG. 55 is a view in the direction of the arrow 55—55 of FIG. 54; and

FIG. 56 is a partially sectioned side view of the flat conductor cable retractor in the fully retracted position.

Figure 1:
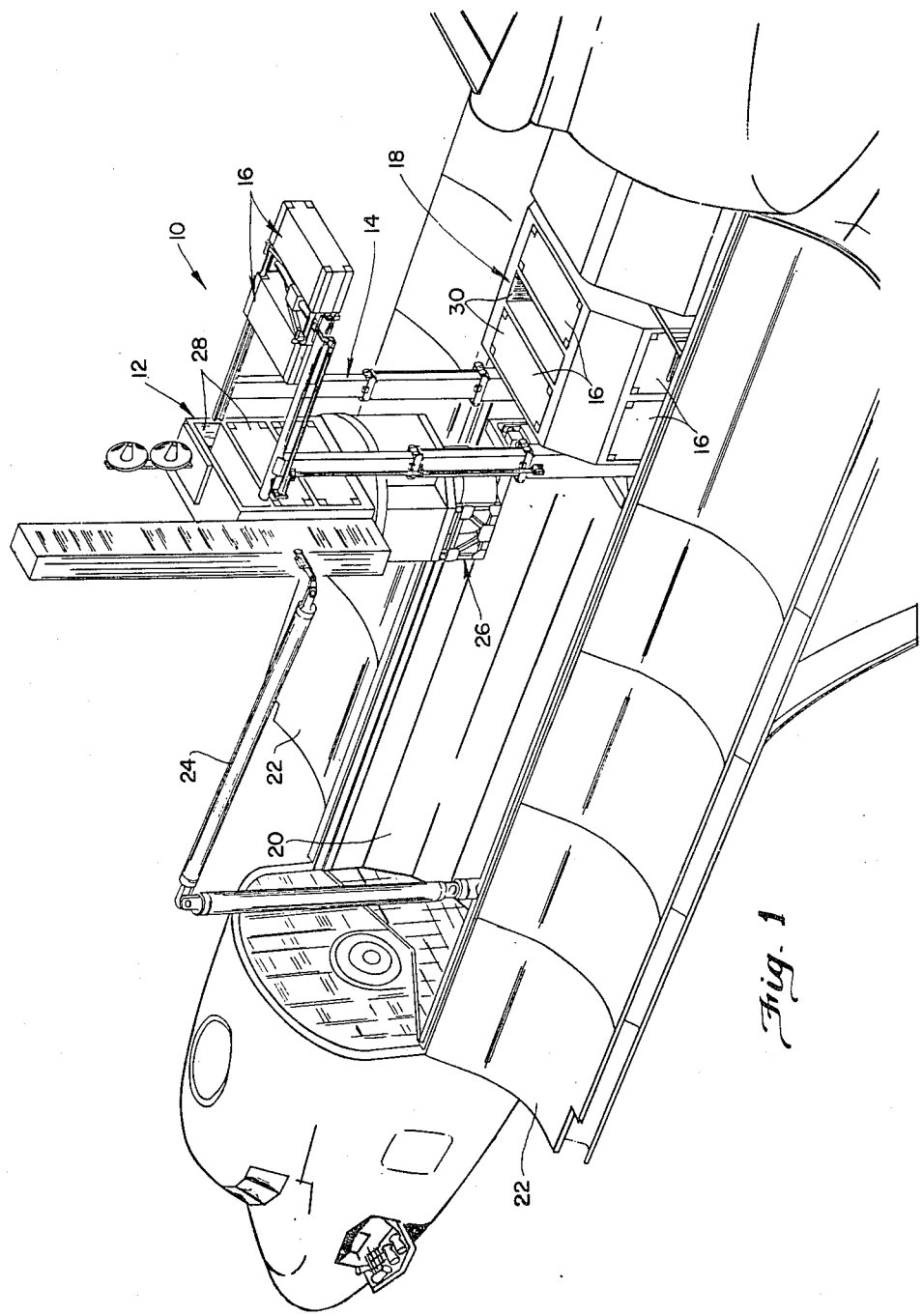

With reference to FIG. 1 of the drawings, the reference numeral 10 refers generally to a shuttle orbitor vehicle in which the cargo bay is open and supports a satellite 12 in a position adjacent to a module manipulator 14 whereby modules 16 may be exchanged between the satellite 12 and a module storage magazine 18.

The shuttle orbitor 10 has a cargo bay 20 which may be opened or closed by doors 22. An articulated arm 24 is operable by a technician located in the passenger compartment of the shuttle to entrap a satellite 12 in its orbit and to locate the satellite 12 on an indexing platform 26 located within the orbitor cargo bay. It will be noted that the same platform 26 may be used to secure a satellite within the shuttle orbitor at the launching or reentry of the shuttle orbitor so as to locate the satellite in its required orbit and subsequently release the satellite from the shuttle vehicle. The platform 26 is adapted to rotatably support the satellite 12 in close proximity to the manipulator 14.

It is important to note that all of the mechanisms illustrated in FIG. 1 of the drawings may be manoeuvered to a position within the confines of the cargo bay of the shuttle. orbitor.

As shown in FIG. 1 of the drawings, the satellite 12 may have a plurality of module compartments 28 and the module storage magazine 18 may also have a plurality of storage compartments 30 for accommodating modules 16 of various sizes.

Figure 2:
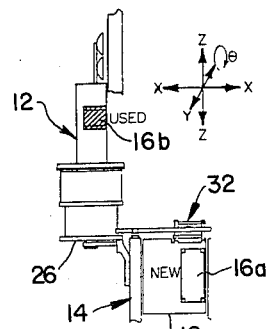

FIG. 2 of the drawings diagrammatically illustrates the satellite 12 mounted on the platform 26 with the module manipulator mechanism 14 located in its retracted storage position. In the operation which is to be carried out, a replacement module 16a is to be substituted for the used module 16b and the used module 16b is to be returned to the storage compartment vacated by the replacement module 16a in the module storage magazine 18. To effect this exchange, the spacecraft 12 is firstly oriented to the position in which the used module 16b is directed towards the module exchange mechanism. This may be achieved by rotating the platform 26 as required.

MODULE EXCHANGE SEQUENCE

Figure 3:
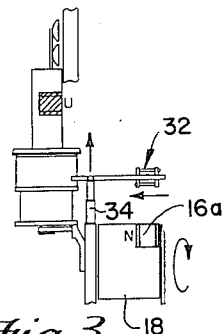
Figure 4:
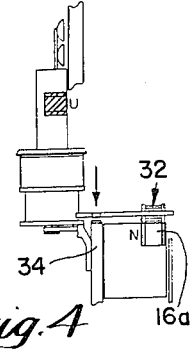
Figure 6:
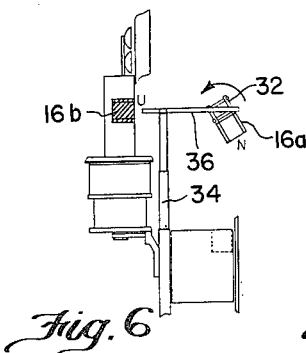
Figure 7:
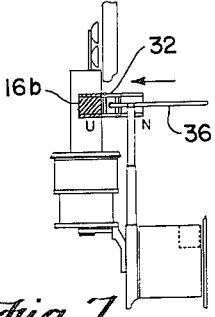
Figure 8:
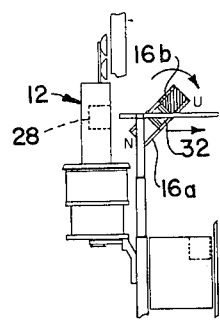
Figure 9:
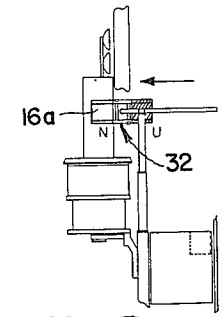
Figure 10:
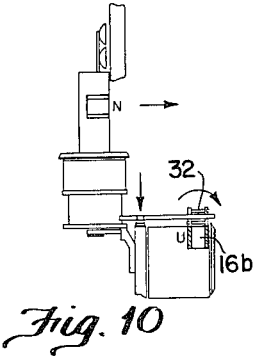

In the module exchange operation, the terminal device 32 which engages the modules is movable in the direction of the axes X—X, Y—Y, Z—Z and rotatable in a direction $\theta$ about the axis Y—Y. In the first step of the transfer operation, the telescoping columns 34 are partially extended and the module storage magazine 18 is rotated as shown by the motion arrows in FIG. 3 so that the replacement module 16a is located directly below the terminal device 32. As shown in FIG. 4, the telescoping members 34 are again retracted so that the terminal device 32 is brought into engagement with the replacement module 16a. The terminal device 32 is therein latched to the replacement module 16a in a manner which will be described hereinafter. The telescoping legs 34 are again extended and the replacement module 16a is withdrawn from its storage compartment 30. The telescoping legs 34 are extended until the X-rails 36 are aligned with the used module 16b. The terminal device 32 is rotated in the direction of the arrow shown in FIG. 6 of the drawings so that the replacement module 16a is located on the opposite side of the terminal device 32 to that on which the used module 16b is located. The terminal device 32 is driven along the X-rails 36 in the direction of the arrow shown in FIG. 7 of the drawings to engage the used module 16b as will be described hereinafter. The terminal device 32 is thereafter moved away from the satellite 12 to withdraw the used module 16b from the compartment 28. The terminal device 32 is rotated about the Y-axis in the direction of the arrow indicated in FIG. 8 of the drawings to align the replacement module 16a with the compartment 28. The terminal device 32 is then driven towards the satellite 12 to locate the replacement module 16a in the compartment vacated by the used module 16b. The terminal device 32 is then manoeuvered to a position in which it is aligned with the compartment vacated by the replacement module and the telescoping legs 34 are retracted to locate the used module 16b in the compartment of the module storage magazine vacated by the new module 16a. This operation may be repeated several times until all of the modules of the satellite have been replaced as required.

ADJUSTABLE TERMINAL DEVICE

Figure 11:
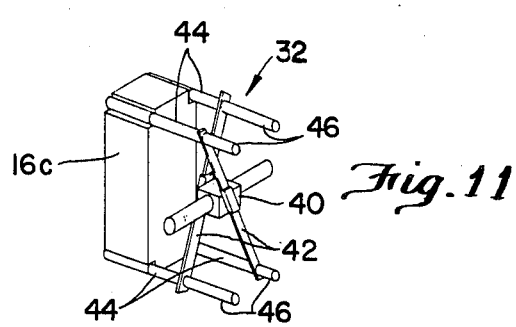
Figure 12:
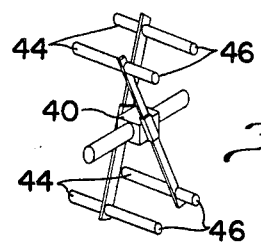
Figure 13:
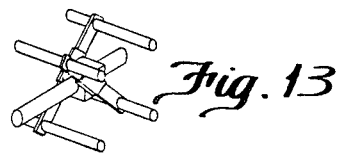
Figure 14:
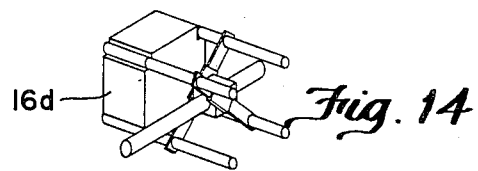
Figure 15:
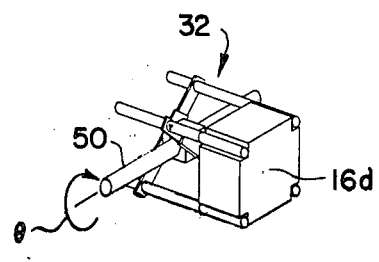

FIGS. 11 to 15 of the drawings diagrammatically illustrate the manner in which the terminal device 32 must be adjustable to accommodate modules 16c and 16d of different proportions. As shown in FIG. 11 of the drawings, the module manipulator 32 consists of a housing 40 which supports arms 42 in an X-shaped configuration. Fingers 44 and 46 project outwardly from opposite ends of the arms 42. In order to accommodate the modules of different proportions, it is necessary to ensure that the terminal device is adjustable as between the positions shown in FIGS. 12 and 13 of the drawings. In order to effect this adjustment, the arms 42 are adapted to telescope with respect to one another to reduce the diagonal distance between diagonally opposed fingers and the arms are mounted to rotate about the axis extending through the center of the X-shaped configuration in order to adjust the spacing of the fingers with respect to one another. Furthermore, as previously indicated, the terminal device 32 is rotatable about the transverse shaft 50 in the direction of the arrow $\theta$ of FIG. 15.

MODULE MANIPULATOR

Figure 23:
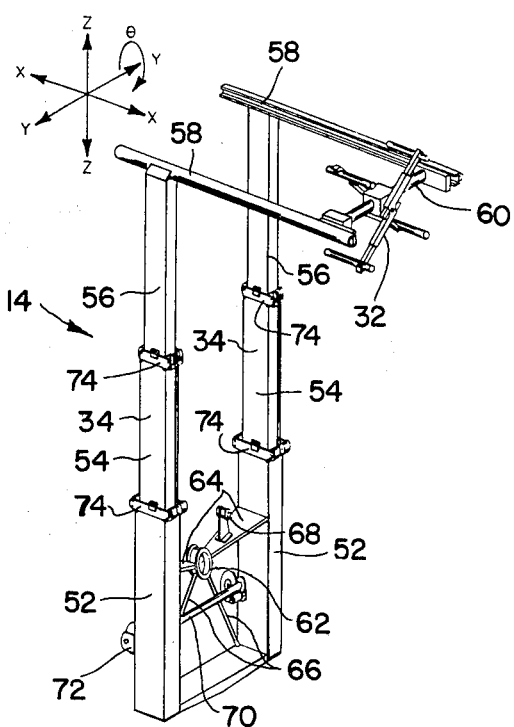
FIG. 23 is a pictorial view of the module manipulator mechanism in an extended position.
Figure 24:
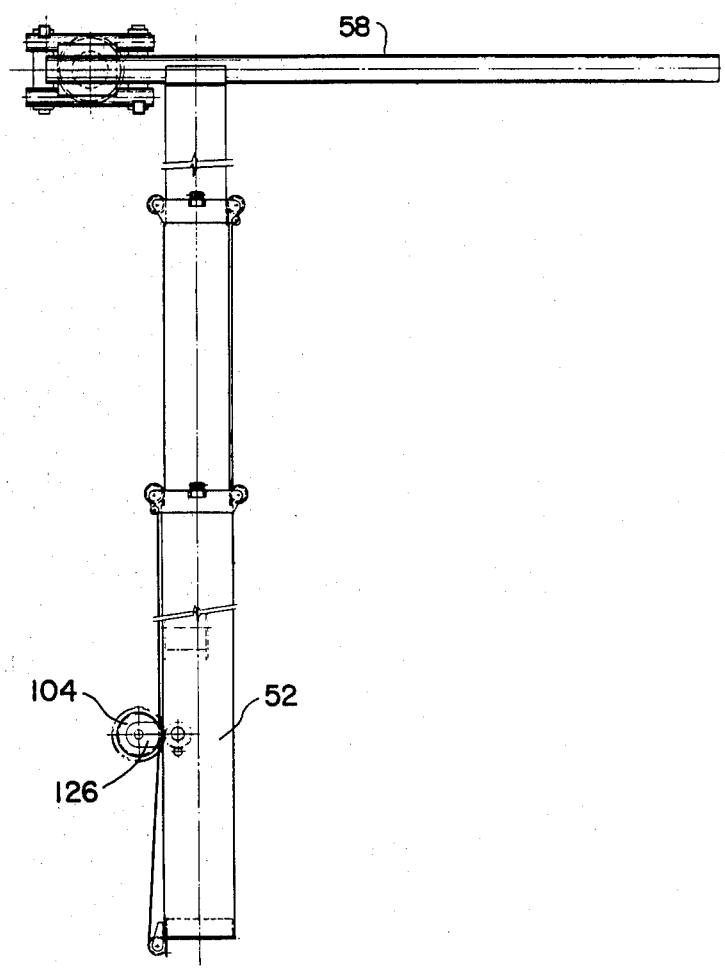
FIG. 24 is a side view of the module manipulator in an extended position.
Figure 25:
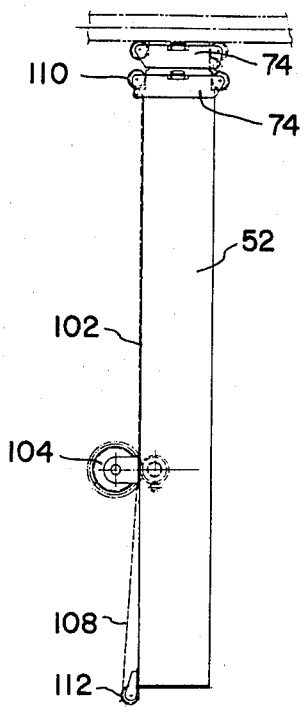
FIG. 25 is a side view of the module manipulator in the retracted position.
Figure 26:
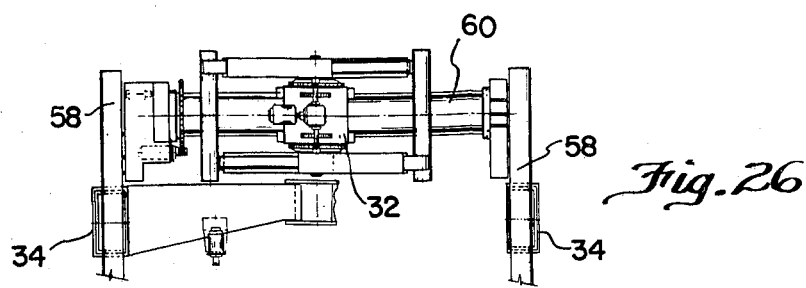
FIG. 26 is a partial top view of the module manipulator including the terminal device.

FIG. 23 of the drawings pictorially illustrates the module manipulator mechanism 14 which consists of a pair of longitudinally extensible columns 34 which include lower sections 52, intermediate sections 54 and upper sections 56 which are telescoped one within the other. Each of the tubular sections 52, 54 and 56 is of a hollow rectangular box-shaped cross-section. The rectangular section contributes to the stability of the structure as it prevents rotation of one tubular portion with respect to the other during the telescoping action. The longitudinal extensible column members are extensible in the direction of the Z-axis and are connected to one another so that the extension of the upper section with respect to the intermediate section and the extension of the intermediate section with respect to the lower section occurs simultaneously at a uniform speed. A guide rail 58 is mounted at the upper end of each upper section 56. The guide rails 58 extend in the direction of the X-axis at right angles to the columns 34. The guide rails 58 have a short portion projecting towards the satellite and a longer portion extending rearwardly therefrom to overlie the module storage magazine 18. A transverse support shaft 60 is mounted at its opposite ends in guide rails 58 and extends transversely therebetween in the direction of the Y-axis. The transverse support shaft is mounted for movement longitudinally of the guide rails 58 in the direction of the X-axis. The terminal device 32 is mounted on the transverse shaft 60 and, as previously indicated, is rotatable about the transverse shaft 60 in the direction of the arrow $\theta$. In addition, the terminal device 32 is movable along the transverse support shaft 60 in a direction of the Y-axis.

One end of the magazine 18 is mounted for rotation in a bearing 62 which is supported between the lower sections 52 of the columns by brackets 64 and braces 66. Magazine locking solenoids 68 are mounted on the brackets 64 and include a locking shaft directed towards the magazine 18. The Z-drive synchronizing shaft 70 is mounted for rotation in brackets 72 carried by the lower column sections 52. Zero-backlash column mounting collars 74 are mounted at the upper end of each of the lower column sections 52 and intermediate column sections 54.

Figure 16:
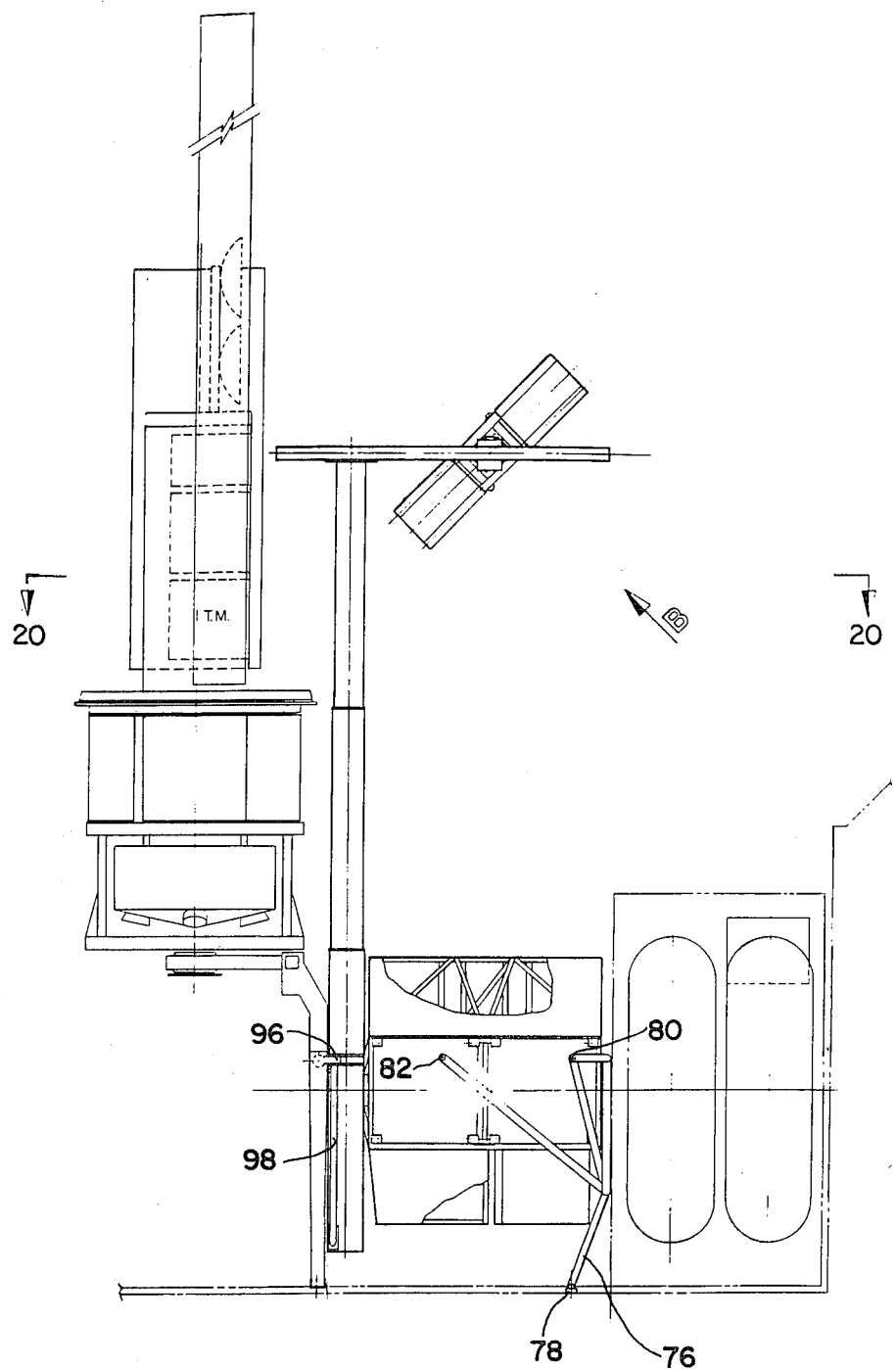
FIG. 16 is a side view of the module manipulator in an extended position.
Figure 17:
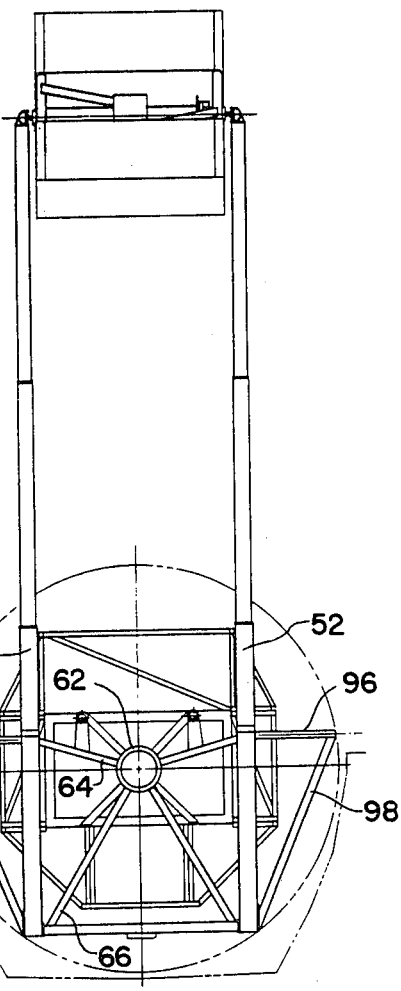
FIG. 17 is a front view of the module manipulator and its associated magazine.
Figure 18:
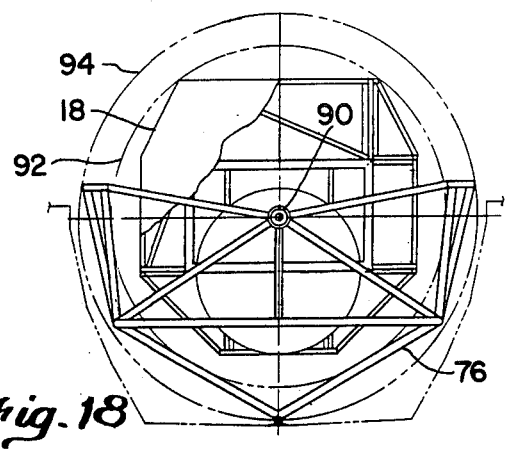
FIG. 18 is a back view of the module magazine and its supporting structure.
Figure 19:
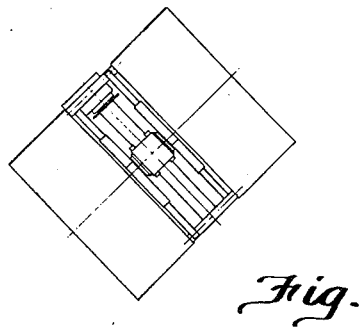
FIG. 19 is a view in the direction of the arrow b—b of FIG. 16.
Figure 20:
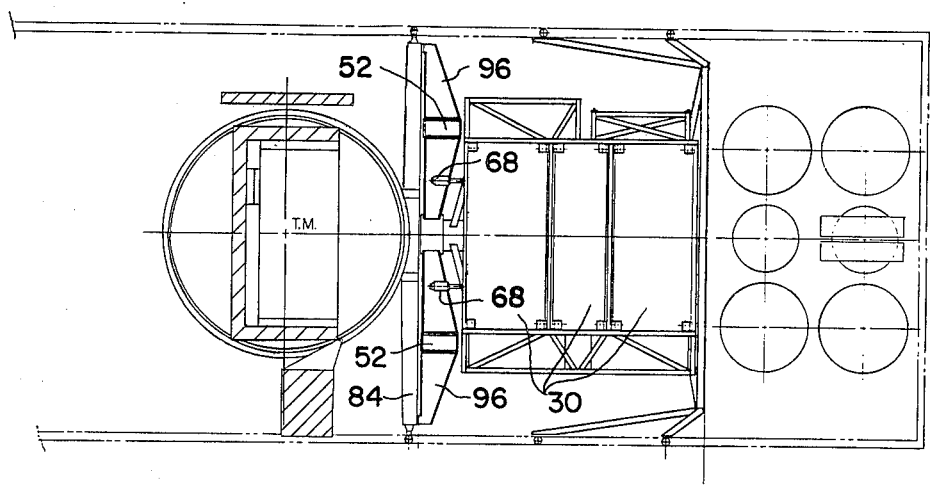
FIG. 20 is a sectional view in the direction of the arrow a—a of FIG. 16.

FIGS. 16 to 21 of the drawings serve to illustrate the manner in which the module manipulator, module storage magazine and satellite may be located with respect to the cargo bay 20 of the shuttle craft. As shown in FIG. 16 of the drawings, the magazine rear support structure 76 is connected to the shuttle craft on opposite sides of the magazine at anchorage points 78, 80 and 82. Similarly, the frame 84 of the satellite mounting platform 26 is secured with respect to the cargo bay at anchorage points 86 and 88. It will be noted that the satellite mounting platform 26 is mounted to pivot about shaft 27 so as to be movable from the position shown in FIG. 22 to the position shown in FIG. 16 of the drawings. The position shown in FIG. 22, wherein the satellite 12 is located within the cargo bay 20, is the position used for transporting the satellite into earth orbit or returning the satellite to earth. With reference to FIG. 18 of the drawings, it will be seen that the magazine rear support structure which is generally designated by the reference numeral 76 supports a bearing 90 in alignment with the bearing ring 62 (FIG. 17). The module storage magazine 18 is mounted for rotation in bearings 62 and 90 within a magazine envelope space defined by the broken line 92 which is disposed radially inwardly from the pay load envelope space 94 of the cargo bay of the shuttle orbitor.

Figure 27:
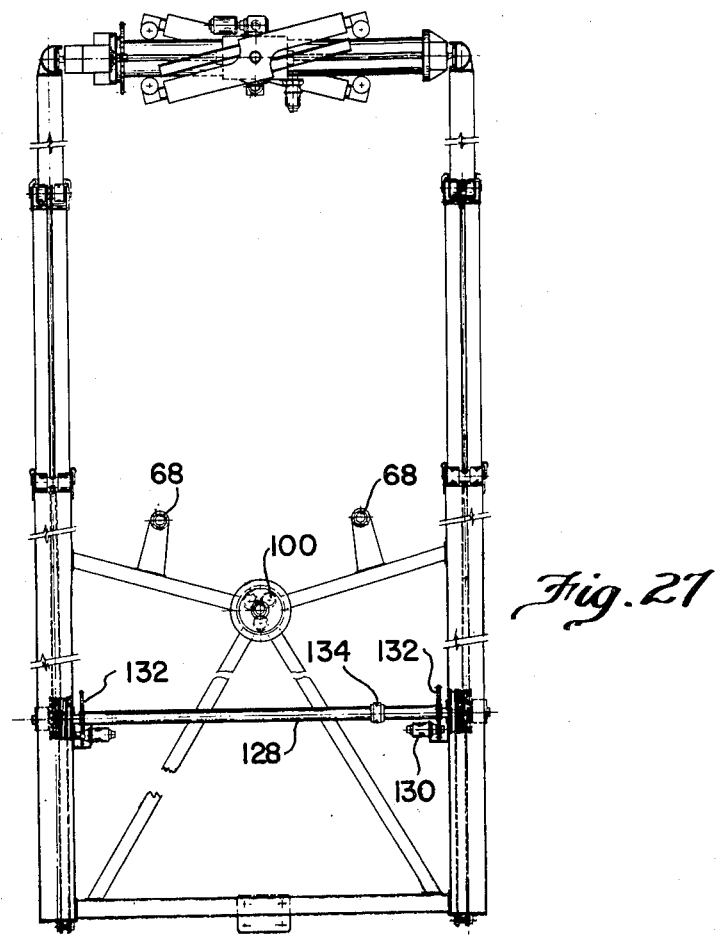
FIG. 27 is an end view of the manipulator in the extended position including the terminal device.
Figure 28:
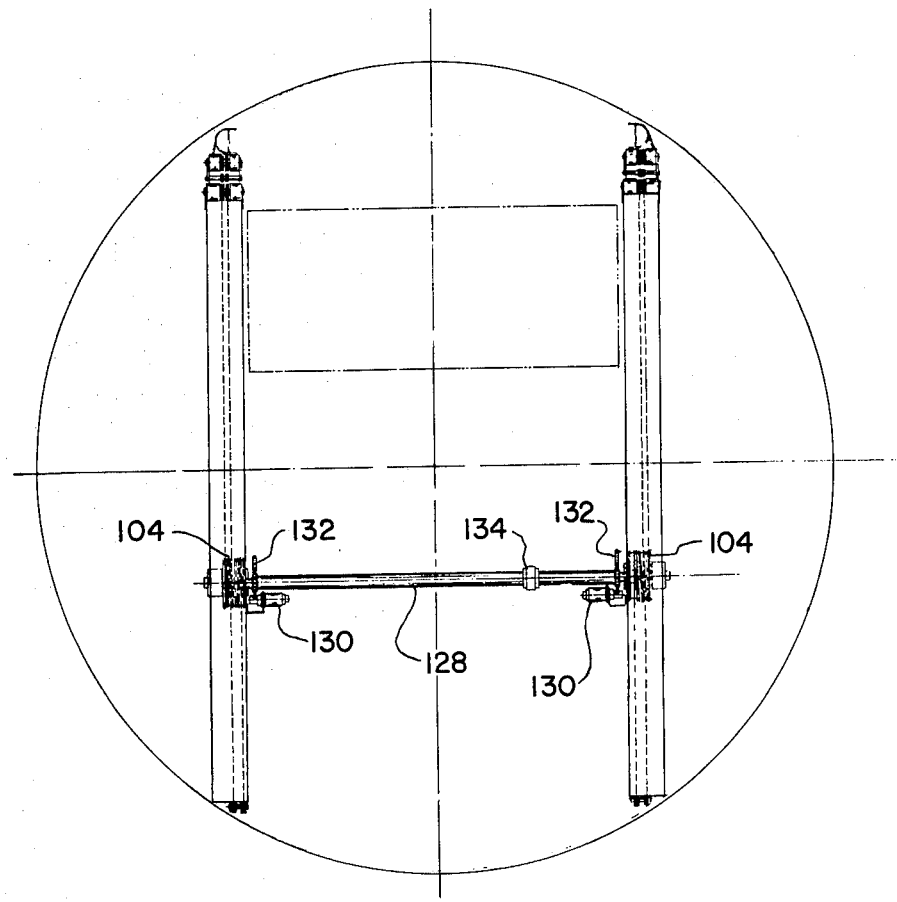
FIG. 28 is an end view of the columns of the module manipulator in the retracted position.

The lower column sections 52 are secured with respect to the support frame 84 of the satellite storage platform 26 by means of a front support structure which includes transversely extending brackets 96 and brace members 98. As previously indicated, a magazine 18 is mounted for rotation in bearings 62 and 90 and is rotatably driven by magazine drive 100 (FIG. 27) to a position in which the module storage compartments 30 are directed upwardly. The magazine is locked in position with the module storage compartments upwardly directed by means of the magazine locks 68 previously described.

MANIPULATOR Z-COLUMN EXTENSION DRIVE

Figure 29:
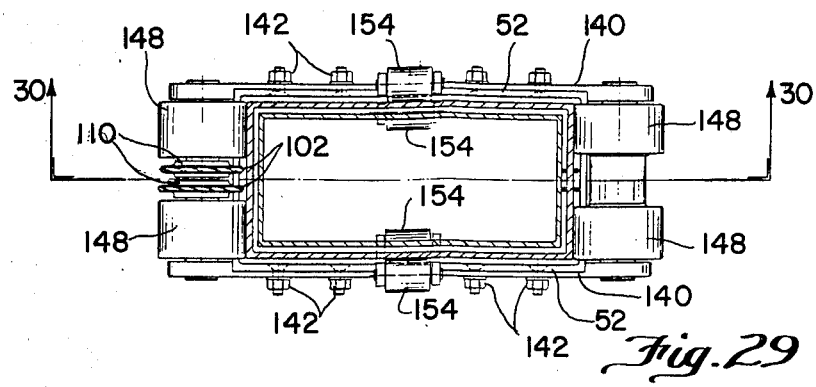
FIG. 29 is a sectional view through the column in the retracted position.
Figure 30:
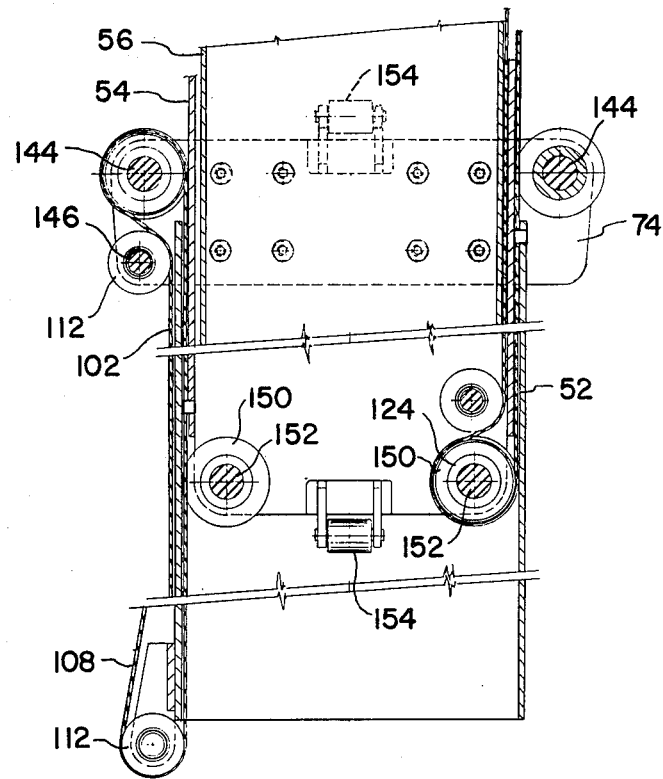
FIG. 30 is a sectional view in the direction of the arrow 30—30 of FIG. 29.
Figure 31:
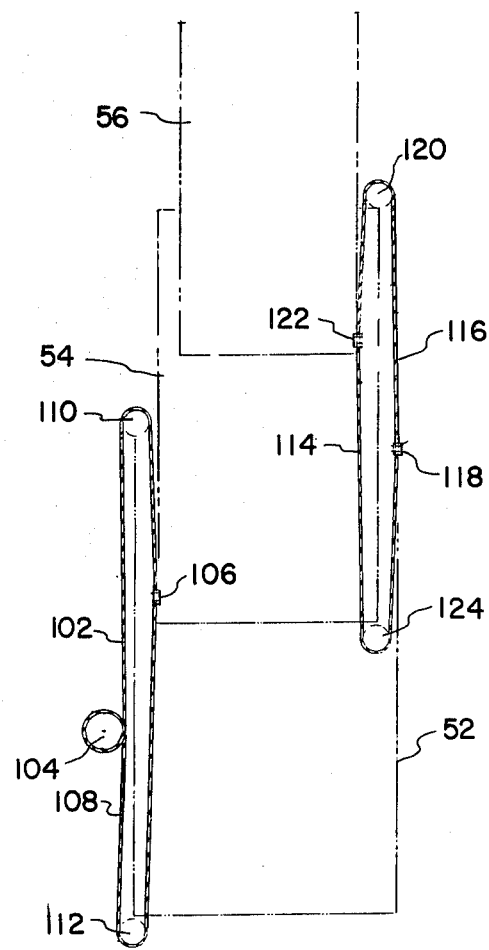
FIG. 31 is a schematic illustration of the cable connections of the drive mechanism for extending the columns.

The column extension drive mechanism is illustrated in FIGS. 24 through 31. As previously indicated, an important feature of the drive mechanism is that it is arranged to extend and retract the telescoping columns synchronously. The cable drive is schematically illustrated in FIG. 31 of the drawings wherein it will be seen that the drive includes a primary extension cable 102 which has one end wound around winding drum 104 and extends upwardly around pulley 110 which is located at the upper end of the lower column member 52 and downwardly within the lower column 52 to be secured with respect to the intermediate column 54 by means of a clamp 106. A primary retraction cable 108 has one end wound around winding drum 104 and extends downwardly around cable tensioning pulley 112 located at the lower end of the lower column member 52 and upwardly to be connected at its upper end to the intermediate column 54 by means of the clamp 106. The drive mechanism also includes second or staging cables 114 and 116. The staging cable 116 is an extension cable and has one end connected adjacent the upper end of the lower column 52 by means of a clamping device 118. The cable 116 extends around a pulley 120 located at the upper end of the intermediate section 54 and has its other end secured by means of a clamping device 122 adjacent the lower end of the upper column section 56. The cable 114 is a retraction cable having one end secured to the upper column section 56 by means of the clamp 122 and the other end secured to the lower column section 52 by means of the clamp 118. The cable 114 extends about a pulley 124 mounted at the lower end of the intermediate column section 54. To extend the column 34, the cable drum is rotatably driven in a direction which winds the primary extension cable 102 thereabout. This has the effect of raising the lower end of the intermediate section 54. The raising of the intermediate section 54 raises the pulley 120 about which the cable 116 extends. One end of the cable 116 is secured with respect to the lower section 52 with the result that raising of the pulley 120 raises the other end of the cable 116 which causes the upper section 56 to extend outwardly from the intermediate section 54. The retraction of the column 34 is achieved by means of the retraction cables in the same manner as that described above with respect to the extension.

FIGS. 24 through 30 serve to illustrate the structure of the drive mechanism used to extend and retract the longitudinally extensible columns 34. As shown in FIGS. 24 through 28, winding drums 104 are mounted on each of the lower column sections 52 by means of mounting brackets 126. A synchronizing drive shaft 128 is connected to and extends between the winding drums 104. Z-drive motors 130 are connected to drive sprockets 132 mounted on the synchronizing shaft 128 to rotatably drive the winding drums. A phase adjustment coupling 134 connects two sections of the synchronizing drive shaft to permit adjustment of the phase of the driving motors 130 as required.

As shown in FIGS. 29 and 30 of the drawings, each of the collars 74 consists of a pair of face plates 140 which are secured with respect to the lower column section 52 by means of a plurality of screw sets 142. A pair of shafts 144 extend between the oppositely disposed face plates 140 and are mounted for rotation therein. A section shaft 146 also extends between face plates 140. The guide cable pulleys 110 are mounted for rotation on one of the shafts 144 and a cable tensioning pulley 112 is mounted for rotation on the shaft 146. Pre-loaded guide rollers 148 are also mounted for rotation on shafts 144. The pre-loaded guide rollers are constructed with a resilient inner core about which a flexible metal sleeve extends. The metal sleeve is sufficiently flexible to permit the inner core to be compressed. A load is applied between the pre-loaded guide rollers 148 and the section of the extensible column member against which they bear. The use of the pre-loaded guide roller serves to prevent backlash in the extensible columns when they are extended and retracted. Additional pre-loaded guide rollers 150 are mounted on shafts 152 within the inner end of the intermediate section and serve to apply a load to the inner surface of the lower column 54. Lateral pressure rollers 154 are mounted at the upper end of the lower section 52 and at the upper and lower ends of the intermediate section 54 and the lower end of the upper section 56. The lateral rollers 154 are of the same construction as the pre-load guide rollers 148 in that they include a resilient inner core and a flexible outer metal lining which permits the application of a pressure to the member which they engage sufficient to resiliently deflect the lateral roller and thereby apply a pressure between the telescoping members which serves to prevent backlash in the structure following extension or retraction. The provision of this backlash prevention configuration enables the Z-drive to function precisely in extending or contracting the extensible columns to permit accurate alignment of the terminal device with respect to the module.

X-RAIL STRUCTURE

The X-rail structure is illustrated in FIGS. 32 to 41 inclusive.

As previously indicated the X-rails 58 are mounted at the upper end of each of the columns 34. The cross-section of the X-rails is illustrated in FIG. 37 of the drawings. Each X-rail 58 consists of an accurate shaped portion 164 which has a vertical flange 166 extending thereacross. Lugs 168 project outwardly from the flange 166 and guide track members 170 are secured thereto. The lower guide track member 170 has a longitudinally extending rack portion 172.

Figure 32:
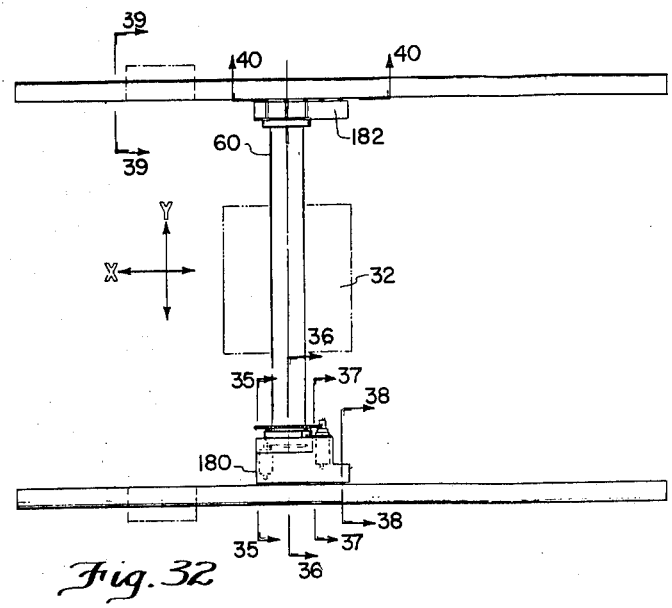
FIG. 32 is a plan view of the X-rails and the transverse support structure.
Figure 33:
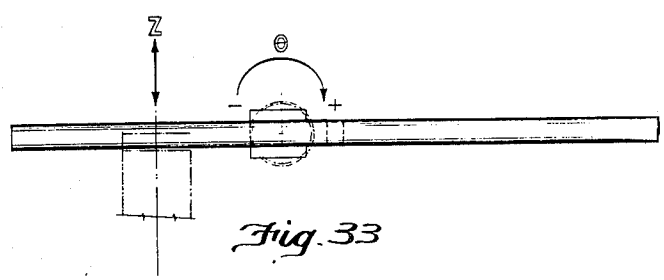
FIG. 33 is a side view of the X-rails.
Figure 34:
FIG. 34 is an end view of the X-rails of FIG. 32.
Figure 35:
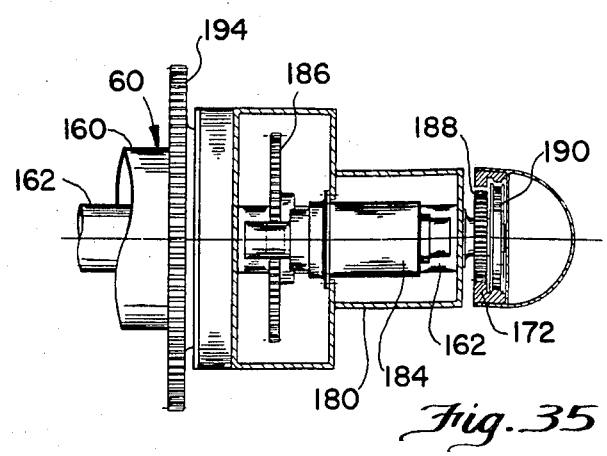
FIG. 35 is a sectional view taken along the line 35—35 of FIG. 32.
Figure 36:
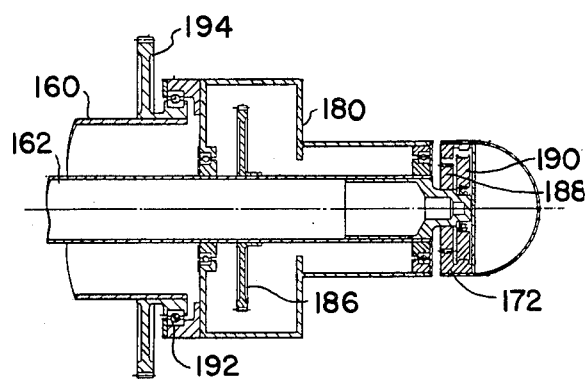
FIG. 36 is a sectional view taken along the line 36—36 of FIG. 32.

As shown in FIG. 32 of the drawings, the transverse support shaft 60 has a carriage 180 located at one end thereof and a further carriage 182 located at the other end thereof. As shown in FIG. 41 of the drawings, the transverse shaft 60 consists of an outer terminal device support shaft 160 and an inner X-drive synchronizing shaft 162. Longitudinal movement of the transverse support member 60 is effected by an X-drive motor 184 which is mounted in the carriage 180 and which has an output drive shaft driving engaging sprocket 186 which is mounted on a synchronizing drift shaft 162. A pinnion 188 is mounted on the end of the shaft 162 which projects into the X-guide rail. The pinnion 188 meshes with the rack portion 172 of the guide track 168. A carriage wheel 190 is mounted on the outer end of the shaft 162 so as to run along the guide rail 168. As shown in FIG. 40 of the drawings, a second pinnion 188a is mounted on the shaft 162 and is meshed with the rack 172a carried by the guide track 168a of the other X-rail. When the motor 184 is activated to drive the sprockets 186, the shaft 162 is driven to drive the pinnions 188 and 188a which in turn move the entire transverse support assembly along the X-rails. It will be noted that the outer support shaft 162 is not rotatably driven by the X-drive motor 184 so that movement along the guide rails does not result in rotation of the terminal device. As shown in FIG. 36 of the drawings, the terminal device support shaft 160 is mounted for rotation with respect to the carriage 180 by means of a bearing 192. A θ-drive gear 194 is secured to the shaft 164 and, as shown in FIG. 37 of the drawings, the gear 194 is meshed with the output shaft 196 of the θ-drive motor 198 which is mounted in the housing 180. When the θ-drive motor is activated, it rotatably drives the gear 194 which in turn drives the shaft 160 to effect the rotation of the terminal device 32 as described hereinafter.

The carriage 180 and the carriage 182 are each supported by two sets of carriage wheels 188, 189 and 200, 201. The carriage wheels 189, 200 and 201 are mounted as shown in FIG. 38 of the drawings on stub shafts 202. The axes of the carriage wheels 200 and 201 are disposed above the axes of the carriage wheels 188 and 189 so that the carriage wheels 200 and 201 bear against the upper guide rail 168 and the carriage wheels 188 and 189 bear against the lower carriage rail. Again, this structure serves to prevent backlash in the θ-drive system.

VARIABLE GEOMETRY TERMINAL DEVICE

The terminal device is illustrated in detail in FIGS. 41 to 48 of the drawings to which reference is now made. As shown in FIG. 41 of the drawings, the terminal device consists of a housing 220 which has passages 222 opening therethrough to receive the transverse support shaft 162. The transverse support shaft 162 has oppositely disposed racks 224 extending longitudinally thereof. Each of the racks 224 has bevelled side edges 226 extending longitudinally thereof. As shown in FIG. 44 of the drawings, the housing 220 carries support roller devices 223 which have angularly inclined rollers 230 mounted thereon for rotation along the bevelled edges 226 of the racks 224. A Y-drive motor 228 is mounted in the housing 220 and drivingly connected to the rack 224 by means of a power transmission assembly 232. When the Y-drive motor 228 is activated, it drives the gears associated with the power transmission shaft 232 which engage the rack 224 so that the housing 220 is driven longitudinally along the shaft 160. This provides a Y-drive requirement of the terminal device.

Figure 46:
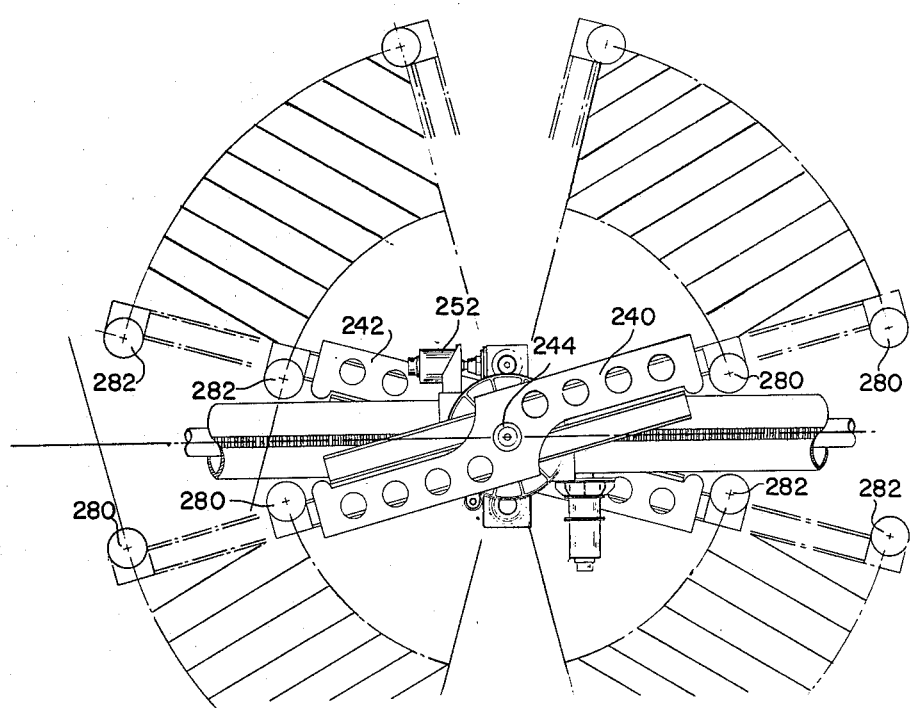
FIG. 46 is a front view of the terminal device mounted on the transverse support member.
Figure 47:
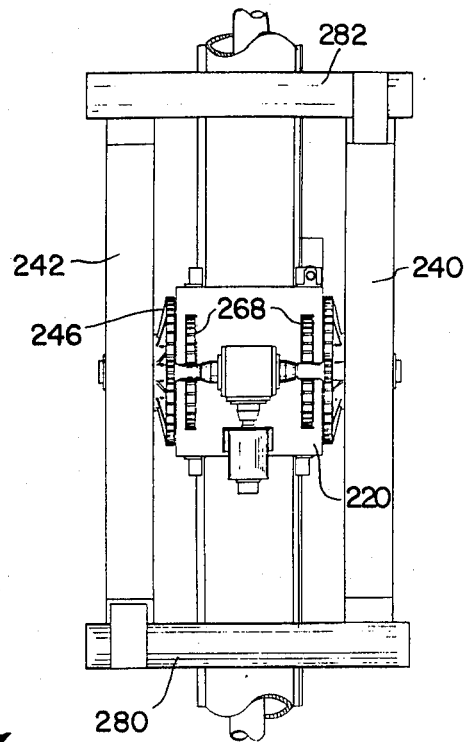
FIG. 47 is a plan view of the terminal device.

With reference to FIGS. 41, 46 and 47 of the drawings, it will be seen that a pair of sleeve-like members 240, 242 are mounted for rotation about axis 244. With reference to FIG. 42 of the drawings, it will be seen that the sleeve members 240 and 242 are each connected to a gear wheel 246 which is mounted for rotation with respect to the housing 220. The gear wheels 246 are meshed with sprockets 248 at opposite ends of scissors-drive motor 250.

As shown in FIGS. 41 and 43 of the drawings, arm members 252 and 254 are mounted for movement with respect to the sleeve 240 and arms 256 and 258 are mounted for movement within sleeve 242. Guide rollers 260 mounted in the sleeve 240 guide the arms longitudinally with respect to one another to telescope with respect to the sleeves 240 and 242. The arms each have a rack 262 at the inner end thereof which is engaged by a pinnion 264 which is keyed to shaft 266. Rotation of the pinnion 264 causes the simultaneous telescoping of the arms 252 and 254 with respect to the sleeve 240 so that the arms may be simultaneously moved outwardly of the sleeve or inwardly of the sleeve as required. A gear wheel 268 is mounted at the inner end of each shaft 266. A motor 270 is mounted on the housing 220 and has an output drive shaft meshed with one of the gears 268. A synchronizing drive shaft 272 (FIG. 42) having gears 274 at opposite ends thereof connects the two gear wheels 268 so that they are synchronously driven with respect to one another.

From the foregoing it will be apparent that the provision of the scissors-drive mechanism and the telescoping drive mechanism permits the diagonally opposed ends of the arms of the terminal device to be moved away from one another and it permits the adjacent ends of the arms to be angularly moved towards or away from one another in the same relation. The range of adjustment of the guide mechanism is diagrammatically illustrated in FIG. 46 of the drawings.

Figure 48:
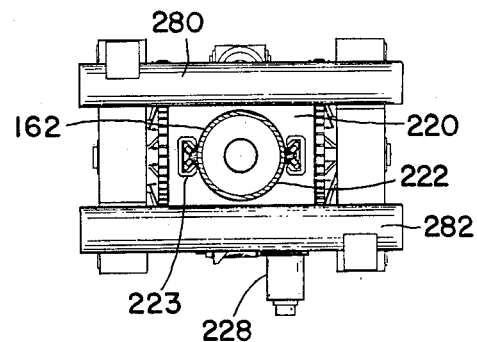
FIG. 48 is a partially sectioned view taken along the line 48—48 of FIG. 47.

Latch operator mechanisms 280 are mounted at the outer end of the arms 252 and 254 and latch operator mechanisms 282 are mounted at the outer ends of the arms 256 and 258. As shown in FIGS. 47 and 48 of the drawings, the latch mechanisms have a long finger extending outward from one side of the arm on which they are mounted and a short finger extending outward from the opposite side thereof so that the outer ends of the arms 280 and 282 are aligned on opposite sides of the terminal device. By adjusting the position of the latch operating members by means of the scissors-drive and the telescoping drive, it is possible to arrange the latch operators in any rectangular pattern required for alignment with the latches of the modules which are to be exchanged.

LATCH OPERATOR MECHANISM

A preferred form of latching mechanism is illustrated in FIGS. 49 and 50 of the drawings. The latching mechanism includes a satellite probe assembly 300 which is mounted within the module storage compartment 28 of the satellite 12, a latching barrel assembly 302 which is mounted in the module 16 and a latch operator 304, two of which are mounted in each latching head 280 to project in opposite directions. Each of the latch operators 280 consists of a tubular housing 306 which is closed at its outer end by means of an end plate 308 which has a tubular extension 310 projecting therefrom, a torque motor 312 is mounted within the housing 306 and is coupled to a threaded shaft 314. The motor 312 may be operated to rotatably drive the shaft 314 in either direction. A stem 316 has its inner end disposed within the housing and its outer end projecting outwardly from the housing. The stem 316 is mounted for rotation in the tubular extension 310 of the end plate 308 of the housing. The inner end of the stem has a threaded bore 318 engaging the threaded shaft 314 such that rotation of the threaded shaft 314 drives the stem 316 longitudinally with respect to the housing. A cam track 320 is located at the outer surface of the inner end of the stem 316 and extends longitudinally thereof. A pre-load ring member 322 is mounted on the end plate 308 by means of shafts 324 which are mounted to reciprocate with respect to the housing 306. Link arms 326 are connected to the shaft 324 and second link arms 328 are connected to the link arms 326 to the housing 306. The inner ends of the link arms 326 and 328 are connected to one another and to a cam follower which rides in the cam track 320. The cam follower 330 will move inwardly and outwardly away from the axis of the stem 316 in response to longitudinal movement of the inner end of the stem 316 to cause the pre-load ring 322 to move outwardly and inwardly of the end plate 308. Locking balls 340 are located in passages which open radially outwardly through the tubular extension 310 of the end plate and when the stem 316 is in the position shown in FIG. 49, the locking balls are located in an annular recess formed in the stem 316. The outer end of the probe has a camming shoulder 342 and a pointed outer extremity 344.

Each of the modules 16 has passages 350 extending therethrough. A shoulder 352 is located adjacent the outer end of the passage 350. A longitudinally split pre-load locking sleeve 354 is located within the passage 350 and has an annular flange at the outer end thereof which rests against the shoulder 352. A tubular latching sleeve 356 is located within the passage 350 inwardly of the locking sleeve 354. The latching sleeve 356 has a flange 358 at the outer end thereof which rests against the flange of the locking sleeve 354 when the latching sleeve is in its innermost position. A compression spring 360 is compressed between the outer end of the latching sleeve 356 and the closure plate 362 of the housing. The closure plate 362 serves to retain the latching assembly within the module. The latching sleeve 356 has a longitudinal passage 364 extending therethrough. A longitudinally split latching barrel 366 projects inwardly from the inner end of the sleeve 356 and has latching lugs 368 at the inner end thereof. Detent means 370 project inwardly from the latching barrel adjacent the inner end thereof and a second pair of detents into the path of the detents 372 which project through the wall of the latching sleeve and a locking detent 374 which projects inwardly from the outer end thereof to extend about the shoulder formed at the inner end of the tubular portion of the locking sleeve.

Figure 5:
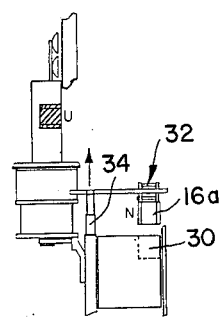

The satellite probe 300 is mounted in a recess 380 formed at the bottom wall of the satellite storage compartment and is urged to the innermost position shown in FIG. 5 of the drawings by disc springs 382. The probe 300 has a head portion 384 at the outer end thereof. The satellite compartment has a satellite guide rail 386 extending longitudinally thereof to guide the module into the compartment in the required alignment. FIG. 49 of the drawings shows the relative positions of the various components of the module latching mechanism in the position in which the module is securely mounted with respect to the satellite with the latch operator mechanism aligned to be advanced into engagement with the latching mechanism to release the module from the satellite.

In order to release the module from the satellite, the latch operator mechanism is advanced so that the outer end of the probe is located within the passage 346 of the latching barrel in a position wherein the balls 340 are aligned with the corresponding receses formed within the latching sleeve 356. The motor 312 is then activated to rotatably drive the threaded shaft 314 which in turn drives the stem 316 longitudinally outwardly from the housing 306. The initial outward movement of the stem 316 forces the locking balls 340 outwardly into the recesses formed in the latching sleeve 356 to secure the latching sleeve with respect to the housing 306 of the latch operator. This in turn secures the module 16 with respect to the housing 306 of the latch operator. Continued driving of the motor 314 causes the stem 316 to move outwardly from the housing 306 and causes the cam follower 330 to ride outwardly along the cam track 320. This causes the link arms 326 to move the pre-load ring 322 outwardly away from the end plate 308 to bear against the face of the module 16. This causes the latching sleeve 356 to move away from the satellite probe to compress the spring 360. The extent of movement effected by the outward movement of the pre-load ring 322 is sufficient to apply a pre-load to the latching probe of the satellite sufficient to overcome the load applied by the pre-load disc springs 382 and thereby release the pressure applied to the latching shoulders 374 of the locking sleeve 354. As the stem 316 continues to advance, the camming shoulder 342 at the outer end thereof engages the detents 372 of the locking sleeve 354 and pushes them outwardly to a sufficient extent to move the latching shoulder 374 radially outwardly from the shoulder at the end of the latching sleeve 356 to release the locking sleeve 354 with respect to the latching sleeve 358. Further advancement of the stem 316 causes the cam follower 330 to begin its inward withdrawal along the inwardly inclined portion of the cam track 320 which withdraws the pre-load ring 322 and permits the latching sleeve to travel towards the satellite probe under the influence of the compression spring 360. The extent of travel of the latching sleeve 356 towards the satellite will be sufficient to permit the satellite probe 300 to withdraw to its fully withdrawn position shown in FIG. 50 and to permit the release of the pressure applied by the latching lugs 368 to the head 384. A still further advancement of the stem 316 causes the pointed end 344 of the stem to engage the first detents 370 so as to spread the outer end of the latching barrel apart to move the locking lugs 368 outwardly from the head 384 to release the head 384. The X-drive means of the terminal device is then activated to move the terminal device away from the satellite to withdraw the module from the satellite as shown in FIG. 50 of the drawings. It will be understood that the operation described above is reversed when locating the replacement module in the module compartment of the satellite and when locating the module which has been removed from the satellite in the storage compartment of the module storage magazine.

ELECTRICAL CABLE DEPLOYING SYSTEM

By reason of the fact that the apparatus of the present invention is intended for use in a weightless environment, it is important to avoid a situation wherein electrical cables are free to become entangled in the adjustable mechanisms. As previously indicated, the terminal device is provided with a total of eleven drive motors including four latch operator drive motors for the new module acquisition system, four latch operator drive motors for the used module acquisition system, a drive motor for the terminal telescoping function, a drive motor for the terminal scissoring function, and a drive motor for driving the terminal device along the Y-axis.

Figure 51:
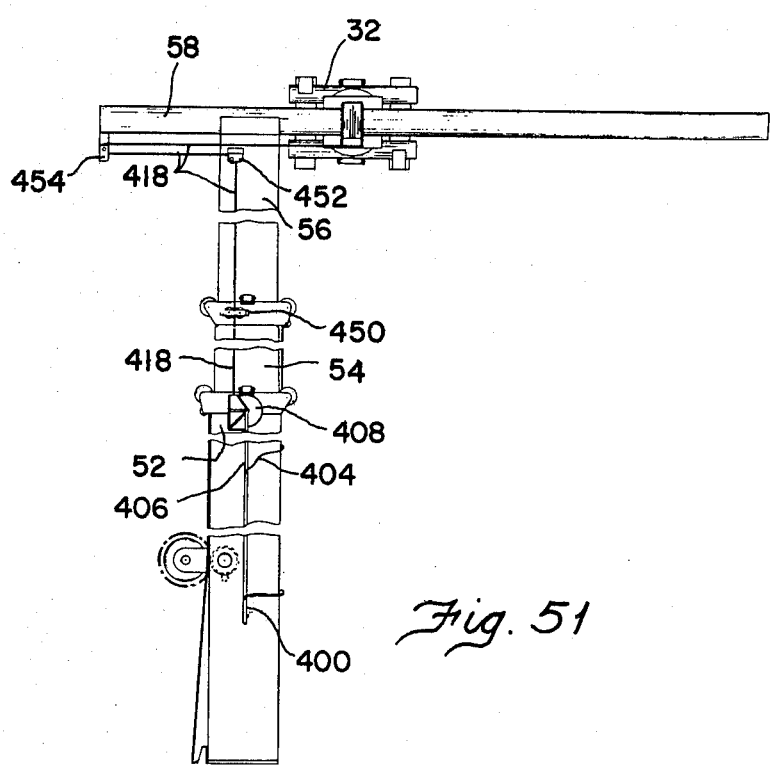
FIG. 51 is a side view of the manipulator illustrating the manner in which the electrical cables are deployed.
Figure 53:
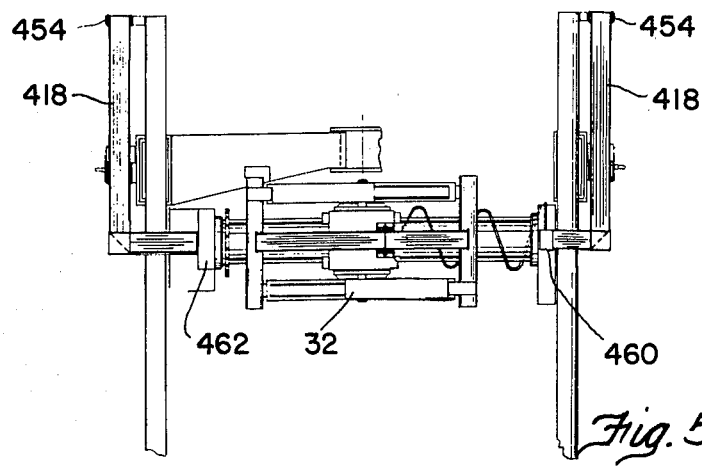
FIG. 53 is a plan view of the manipulator of FIG. 52.
Figure 52:
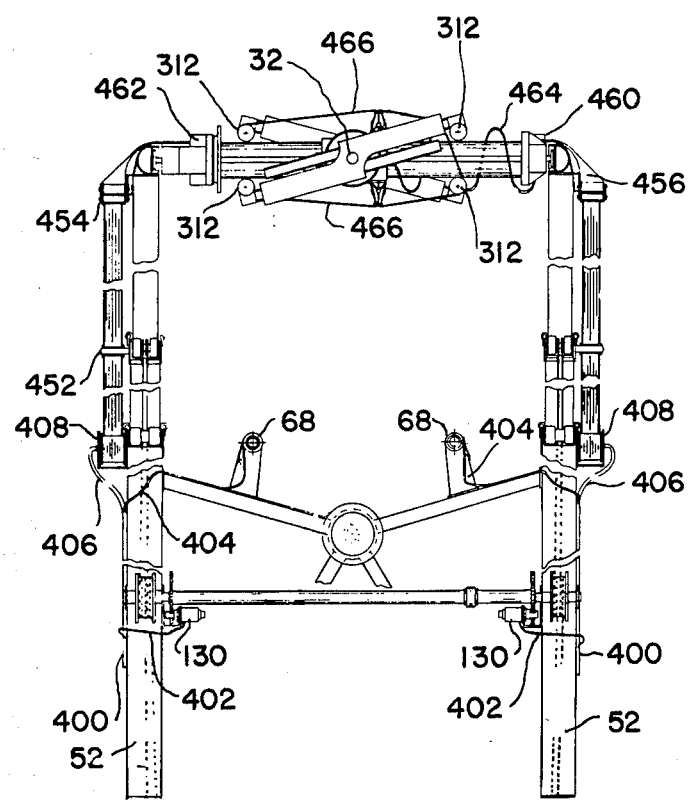
FIG. 52 is a front view of the manipulator illustrating the manner in which the electrical cables are deployed.

As shown in FIGS. 51 to 53, the electrical cables carried by the module manipulator extend from shuttle interface junction boxes 400 mounted on the stationary legs 52 of the manipulator. Fixed cables 402, 404 and 406 extend from the junction box 400 to the Z-drive motors 130, magazine lock drives 68 and a pair of flat conductor cable retractor units 408, respectively. As shown in FIGS. 51 to 53 of the drawings, the flat conductor cable retractors 408 are mounted on the fixed legs 52. The flat conductor cable retractor units 408 are illustrated in detail in FIGS. 54 to 56 of the drawings. Each of the retractors 408 consists of a pair of end plates 410 within which a hollow shaft 412 is rigidly mounted. The shaft 412 has an opening 414 at one end thereof through which the electrical cables 406 extend. The electrical cables 406 are separated from one another within the shaft 412 into a flat conductor cable array and extend outwardly from the shaft 412 through a longitudinally extending slot 416 which is formed in the shaft 412. The electrical cables are identified by the reference numeral 418 when arranged in the flat conductor cable configuration. A winding drum 420 is mounted for rotation on the shaft 412 by means of bearings 422. The winding drum 420 has an outer winding cylinder 424 spaced radially outwardly from the shaft 412 and has a transverse slot 426 opening therethrough. The flat conductor cable 418 is formed with a plurality of turns inwardly of the winding drum before passing through the slot 426. A rewinding coil spring 428 has one end secured with respect to the shaft 412 and the other end secured with respect to the winding drum within a housing 430 at one end thereof. A pair of guide rollers 432 and 434 are mounted in the frame members 408 and extend transversely thereof and serve to guide the flat conductor cable 418 which passes therebetween. As the flat conductor cable 418 is deployed, the rotation of the winding drum in the unwinding direction tightens the coil spring 428 such that when the deploying load is removed from the flat conductor cable 418, the cable will be rewound on the drum 420 under the influence of the coil spring 428.

As shown in FIGS. 51 to 53 of the drawings, two flat conductor cables 418 are mounted in two retractors 408, one of which is mounted at the upper end of each of the fixed legs 52 of the manipulator mechanism. The cables 418 are directed upwardly through guide rollers 450 mounted at the upper end of the intermediate leg portions 54 and guide rollers 452 mounted adjacent the upper end of the upper legs 56. At the guide rollers 452, the cables 418 are redirected horizontally to guide rollers 454 located at one end of the X-rails 58. The cables 418 extend around the guide rollers 454 and thereafter extend towards the terminal device 32. A portion of each cable 418 is secured to a flat conductor cable support outrigger 456 about which the cable is folded along a fixed fold. The outer ends of the cables 418 are secured to stationary junction boxes 460, 462. Preferably the X and θ-drive wiring is provided by the flat conductor cable 418 extending to the junction box 462 while the terminal device wiring is connected to the junction box 460. An electrical cable 464 extends from the junction box 460 to the terminal device 32 and has several free turns which accommodate rotation of the terminal device about the Y-axis in the θ direction. Electrical cables 466 extend from the core of the terminal device 32 to the torque motors 312 of the latching mechanism and again the cables 466 are adjustable with respect to the terminal device 32 so as to accommodate the telescoping and scissoring movement of the latching devices.

From the foregoing it will be apparent that the present invention provides an efficient apparatus which is capable of effecting a module exchange in a shuttle orbitor, tug or conventional booster vehicle for servicing space serviceable satellites which have been entrapped thereby.

The embodiments of the invention in which an exclusive property or privilege is claimed are defined as follows:

1. An adjustable terminal device for use in a module manipulator of a shuttle orbiter to effect transfer of modules between a satellite and the shuttle orbiter wherein the mounting means of different modules are arranged in different spaced relationships, comprising:
  (a) a housing having passage means opening therethrough for mounting said terminal device for rotation about a rotational axis of said module manipulator;
  (b) a pair of sleeves arranged one or either side of said housing and mounted on said housing for rotation about an axis disposed normal to said rotational axis;
  (c) a pair of arms slidably mounted in each sleeve and projecting from opposite ends thereof;
  (d) module support fingers at the outer end of each arm projecting on opposite sides of said rotational axis to provide four fingers arranged in a generally rectangular configuration on diametrically opposite sides of said rotational axis;
  (e) telescopic drive means mounted on said housing and communicating with said arms to synchronously drive said arms with respect to said sleeves to move the arm longitudinally with respect to one another to move the fingers associated with each set of arms towards and away from one another; and
  (f) scissors drive means mounted on the housing and communicating with each of said sleeves to synchronously drive the sleeves with respect to one another about said axis extending normal to said rotational axis whereby the fingers associated with one set of arms are angularly displaced with respect to the fingers associated with the other set of arms to move adjacent fingers with respect to one another.

2. In a module exchange system for exchanging modules between a module storage magazine of a space service vehicle such as a shuttle orbiter, tug or conventional booster vehicle and a module compartment of a satellite by means of a module manipulator carried by the space service vehicle, for improvement of;

(a) latching probe means mounted in the module compartment of the satellite, said latching probe means having a passive latching head at the outer end thereof,
(b) active latching means mounted in each module, said active latching means having one end movable into and out of latching engagement with the passive latching head of the latching probe means to releasably engage the latching probe means to releasably secure the module with respect to the satellite, said active latching means being retained by the module so as to be removed with the module for return to earth with the module for servicing, and
(c) active latch operator means mounted on the module manipulator for engaging and activating the active latching means to engage and release the passive latching head to secure and release the module with respect to the satellite, the latch operator means being retained by the manipulator to be returned to earth with the satellite for servicing.

3. In a module exchange system for exchanging modules between a module storage magazine of a space service vehicle such as a shuttle orbiter, tug or conventional booster vehicle and a module compartment of a satellite by means of a module manipulator carried by the space service vehicle, the module compartment having an inner end and an open outer end, and each module having latching passage means extending therethrough from the outer end to the inner end thereof, the improvement of:
(a) latching probe means mounted at the inner end of the module compartment for movement towards and away from said open outer end and spring means normally urging the probe means to an innermost position towards the inner end of the compartment, said latching probe means having a passive latching head;
(b) active latching means mounted in each module comprising:
(i) a latching sleeve which is slidably mounted within said passage means of said module for movement between a probe release position towards the inner end of the module and a probe latching position towards the outer end of the module, preload spring means engaging the latching sleeve and normally urging the latching sleeve towards said probe release position;
(ii) said latching sleeve having a longitudinal passage extending therethrough, an inner end opening towards the latching probe means connected to the satellite module compartment and an outer end opening towards the manipulator;
(iii) means at the inner end of the latching sleeve for engaging the head of said probe means to releasably secure the probe means with respect to the latching sleeve, said inner end of said sleeve being expandable to release the head of the probe means;
(iv) first detent means projecting inwardly of the sleeve adjacent the inner end of the sleeve for engagement with an active latch operating means on the manipulator to expand the inner end of the sleeve outwardly to release the head of the probe means;
(v) locking means for releasably locking the sleeve to prevent expansion thereof and to prevent release of the preload spring means when the latching probe means is engaged by the active latching means;
(vi) said locking means including second detent means projecting inwardly through the wall of the sleeve to extend into the longitudinal passage of the sleeve at a location inwardly from the first detent means whereby the second detent means is engaged by the latch operating means to release the locking means before the latch operating means engages the first detent means to release the latching probe means,
(c) the active latch operating means carried by said manipulator comprising:
(i) a housing having a tubular member extending from one end positionable in alignment with the longitudinal passage of the latching sleeve of the module;
(ii) a threaded shaft mounted for rotation within the housing and means within the housing for rotatably driving the threaded shaft;
(iii) a stem passing through said tubular member and having an inner end disposed within the housing and an outer end projecting outwardly from the housing, means at the inner end of the stem for threadably engaging the threaded shaft whereby rotation of the threaded shaft drives the stem longitudinally inwardly and outwardly of the housing through the tubular member;
(iv) cam track means carried by the stem and extending longitudinally thereof;
(v) preload ring means at the outer end of the housing mounted for movement relative to the housing in a direction towards the module;
(vi) link arm means connecting the preload ring means to said housing inwardly thereof;
(vii) cam follower means mounted on the link arm means and engaging the cam track means to effect movement of the preload ring means with respect to the housing in response to longitudinal movement of the stem within the housing;
(viii) means at the outer end of the tubular member for releasably locking the tubular member with respect to the latching sleeve in response to movement of the stem,
(d) said rotatable driving means being operable following mating of the stem within the passage means of the latching sleeve to operably locate the housing member with respect to the latching sleeve to:
(i) firstly drive the stem outwardly from the tubular member to activate the locking means between the tubular member and the latching sleeve to secure the tubular member with respect to the latching sleeve;
(ii) secondly, activate the link arm means by directing the cam follower means along the cam track means to force the link arm means and the preload ring means respectively outwardly against the outer face of the module until sufficient preload has been applied to the latching probe means of the satellite to overcome the load applied by the pre-load spring means;
(iii) thirdly, engage the second detent means and thereby release said locking means;
(iv) fourthly, activate the link arm means to withdraw the preload ring means to release the pressure applied thereby to permit the latching sleeve to slide towards the satellite;

(v) fifthly, engage the first detent means and thereby release the latching probe means; and (vi) thereafter, the manipulator withdraws the module from the satellite in contact with the latch operating means.

4. In a module manipulator mechanism for use in a space service vehicle such as a shuttle orbiter, tug or conventional booster vehicle for servicing a satellite of the space serviceable type which has been entrapped by the service vehicle and secured on a servicing platform thereof, the satellite having at least one removable module located in an exchange position and the service vehicle having a replacement module storage magazine having at least one replacement module located therein, the module manipulator mechanism including a terminal device and means for moving the terminal device in the direction of orthogonally disposed first, second and third axes to effect movement between a first position closely adjacent said storage magazine and a second position located adjacent said removable module of said satellite, said means for moving the terminal device including transverse support means extending in the direction of said third axis, the improvement wherein said terminal device comprises;

(a) a housing having passage means opening therethrough to receive said transverse support means, (b) a pair of sleeves arranged one on either side of said housing and mounted on said housing for rotation about an axis disposed normal to said third axis, (c) a pair of arms slidably mounted on each sleeve and projecting from opposite ends thereof, (d) module engaging means comprising a module support finger at the outer end of each of said arms, said module support fingers projecting on opposite sides of said third axis to provide four fingers arranged in a generally rectangular configuration on diametrically opposite sides of said third axis, (e) telescoping drive means mounted on said housing and communicating with said arms to synchronously drive said arms with respect to said sleeves to move the arms longitudinally with respect to one another and to move the fingers associated with each set of arms towards and away from one another, (f) scissors drive means mounted on the housing and communicating with each of said sleeves to synchronously drive the sleeves with respect to one another about said axis extending normal to said third axis whereby the fingers associated with one pair of said arms are angularly displaced with respect to the fingers associated with the other pair of said arms to move adjacent fingers with respect to one another, and (g) terminal drive means mounted on said housing and communicating with said transverse support means for driving said terminal device in the direction of the third axis to align the terminal drive with respect to the modules of the magazine and the satellite as required.

5. A module manipulator mechanism as claimed in claim 4 wherein said transverse support means includes a hollow shaft concentric with said third axis, said terminal drive means including rack means extending longitudinally of said hollow shaft, motor driven pinion means mounted on said housing, and housing drive means being operable to drive said housing along said shaft to effect the transverse alignment of said fingers with respect to the module to be manipulated thereby.

6. A module manipulator mechanism for use in a space service vehicle such as a shuttle orbiter, tug or conventional booster vehicle for servicing a satellite of the space serviceable type which has been entrapped by the service vehicle and secured on a servicing platform thereof, the satellite having at least one removable module located in an exchange position and the service vehicle having a replacement module storage magazine having at least one replacement module located therein, said manipulator mechanism comprising;

(a) longitudinally extensible column means having an inner end and an outer end, said column means being mounted at its inner end adjacent said storage magazine, said extensible column means being extensible in the direction of a first axis from a first position closely adjacent said magazine to a second position in which the outer end thereof is located adjacent said removable module of said satellite;

(b) guide rail means mounted at the other end of said extensible column means and extending normal thereto, said guide rail means extending above said module storage magazine in the direction of a second axis which is normal to said first axis;

(c) transverse support means mounted on said guide rail means and extending in the direction of a third axis which is normal to said first axis and normal to said second axis, said transverse support means being mounted for movement along said guide rail means from a position overlying said module storage magazine to a position closely adjacent said satellite;

(d) a terminal device mounted on said transverse support means for rotation about said third axis, module engaging means mounted on said terminal device for releasing said removable module from said satellite and for releasing said replacement module from said storage magazine and securing said removable module and said replacement module with respect to the terminal device, said terminal device being movable along the transverse support means in the direction of the third axis;

(e) first drive means communicating with said extensible column means for moving said extensible column means to move the terminal device into engagement with said replacement module in the storage magazine and to elevate the guide rail means to align the terminal device with respect to said removable module of the satellite;

(f) second drive means communicating with said transverse support means for driving said transverse support means along said guide rail means to align the terminal device with said replacement module in said magazine and to move the terminal device into and out of engagement with said removable module of the satellite;

(g) θ-drive means communicating with said terminal device for rotatably driving said terminal device about said third axis of said transverse support means to orient the terminal device in alignment with said replacement module of the magazine and said removable module of the satellite as required;

(h) third drive means communicating with the terminal device for driving the terminal device along the transverse support means in a direction of the third axis to transversely align the terminal device with respect to the modules of the magazine and satellite as required, (i) said longitudinally extensible column means comprising, a first tubular member which is secured with respect to the service vehicle, a second tubular member which is mounted to telescope within the first tubular member, a third tubular member which is mounted to telescope within the second tubular member, said first drive means communicating with said second and third tubular members to cause simultaneous telescopic extension and retraction of said second tubular member with respect to said first tubular member and the third tubular member with respect to the second tubular member, (j) pressure guide roller means communicating between said first tubular member and said second tubular member and between said second tubular member and said third tubular member, said pressure guide roller means each comprising a resilient inner core encased in a flexible metal outer sheath, the pressure applied by the guide roller means to the tubular member to which it is applied being sufficient to resiliently deflect the outer sheath of the roller means by compressing the resilient inner core of the roller means whereby said pressure roller means provide a self-adjusting zero clearance engagement with the tubular member to which they are applied to eliminate backlash in the column means when the column means are extended and retracted.

* * * * *

UNITED STATES PATENT OFFICE
CERTIFICATE OF CORRECTION

Patent No. 4,079,904   Dated March 21, 1978

Inventor(s) Ernest Groskopfs et al.

It is certified that error appears in the above-identified patent and that said Letters Patent are hereby corrected as shown below:

Column 14, line 36 "or" should read -- on --.

Signed and Sealed this

Eighth Day of August 1978

[SEAL]

Attest:

RUTH C. MASON
*Attesting Officer*

DONALD W. BANNER
*Commissioner of Patents and Trademarks*